June 14, 1960
H. S. HARRISON
2,940,400
AUTOMATIC SELECTIVE DISPATCH AND
TRANSFER CONVEYOR SYSTEM
Filed Feb. 28, 1958
27 Sheets-Sheet 15
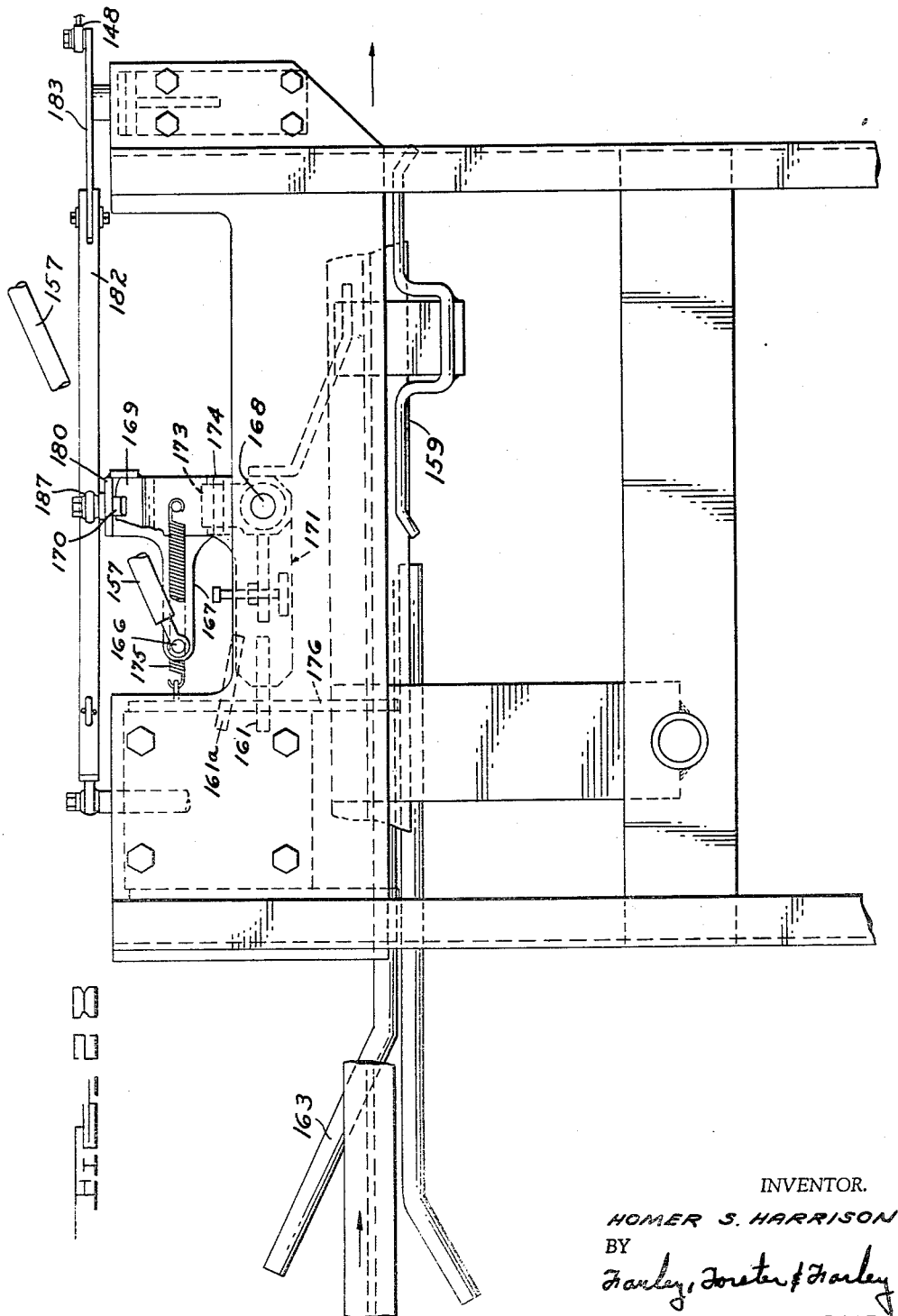
INVENTOR.
HOMER S. HARRISON
BY
Farley, Forster & Farley
ATTORNEYS

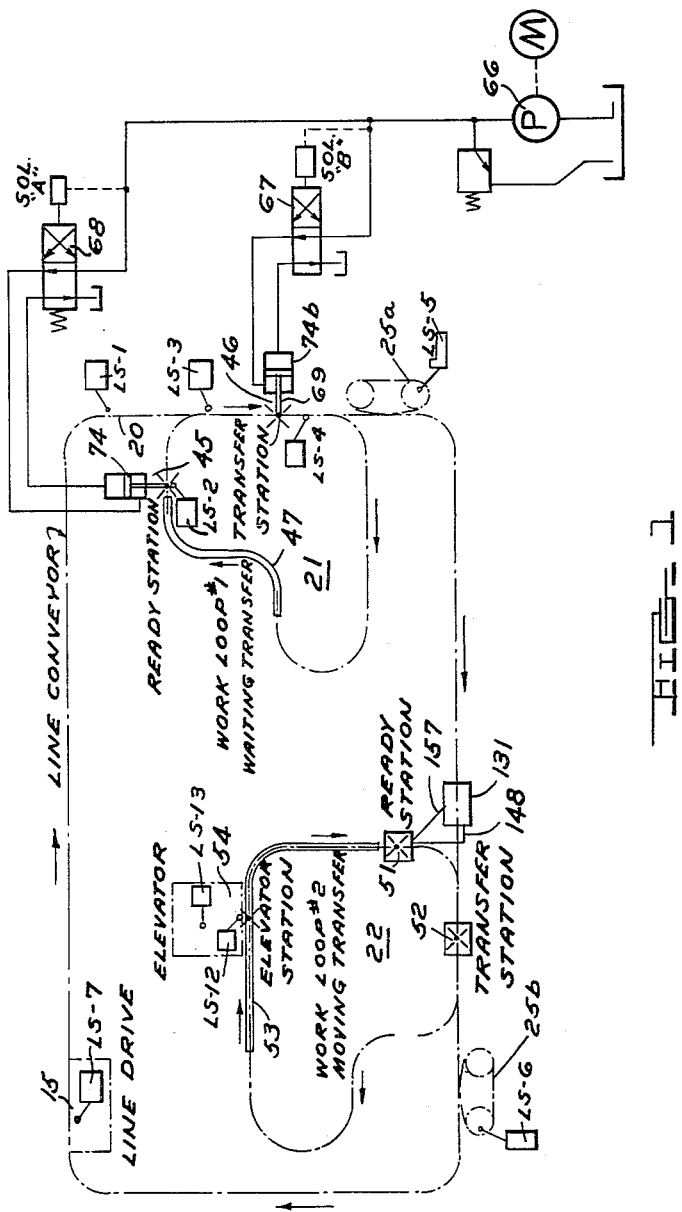

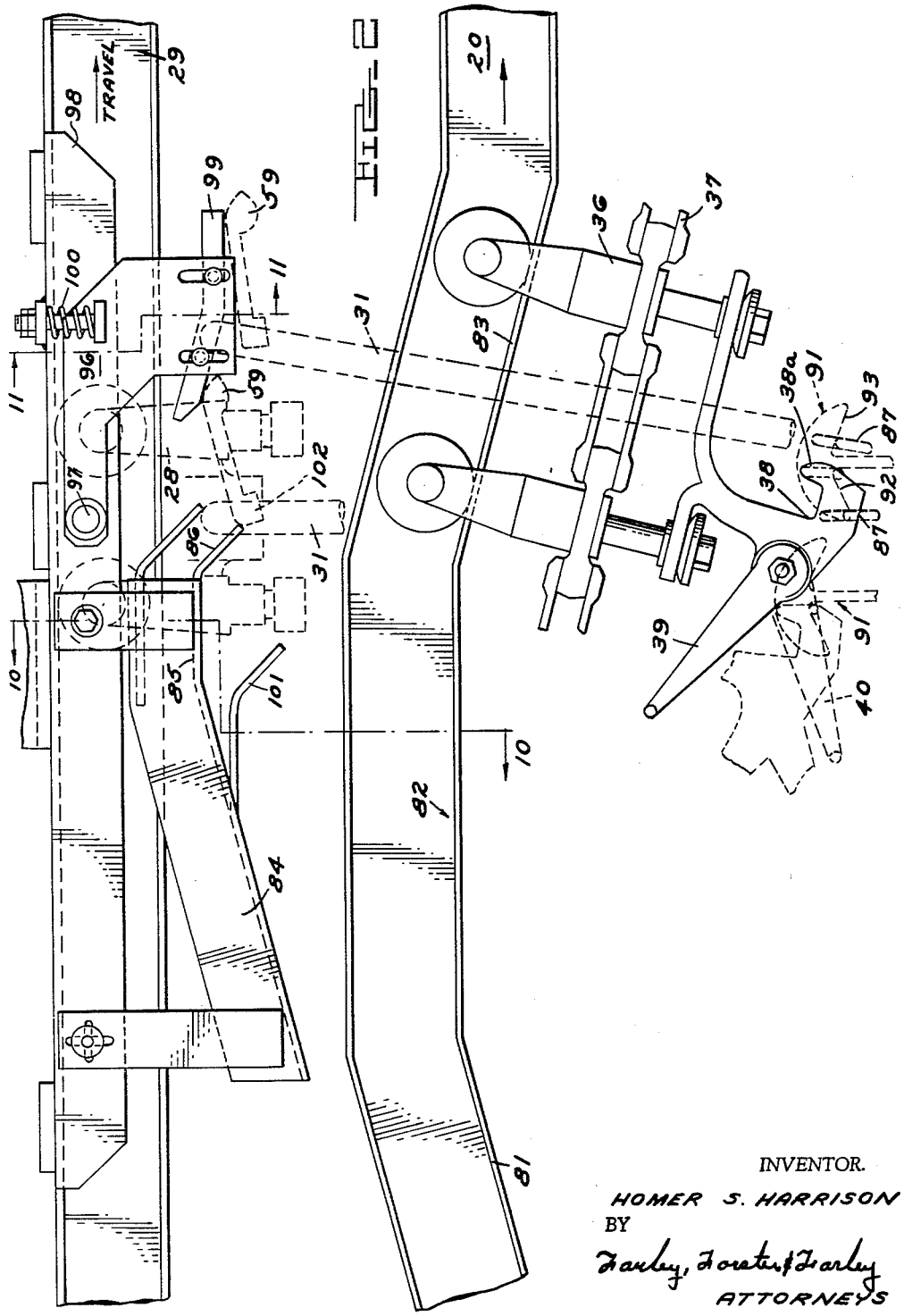

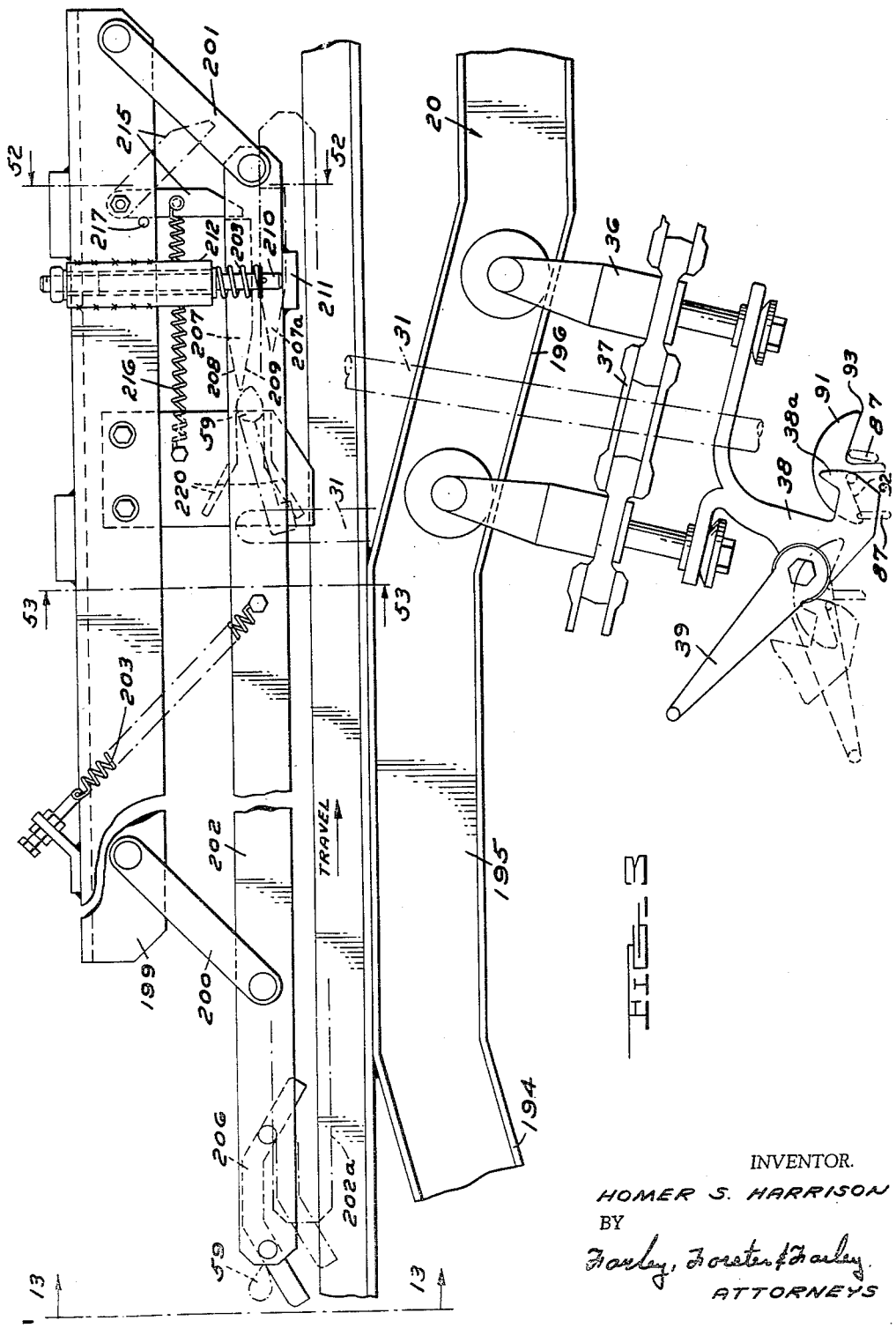

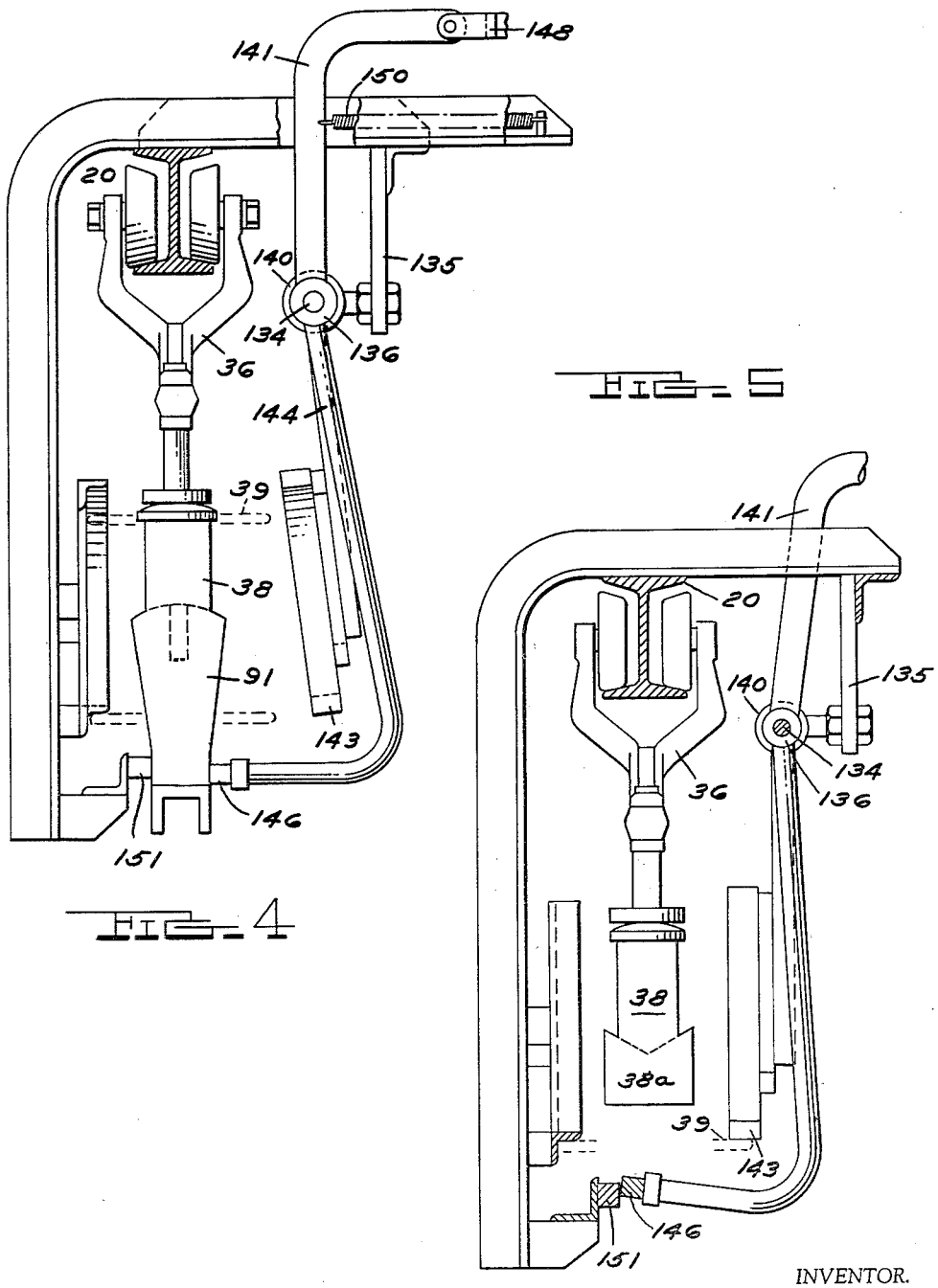

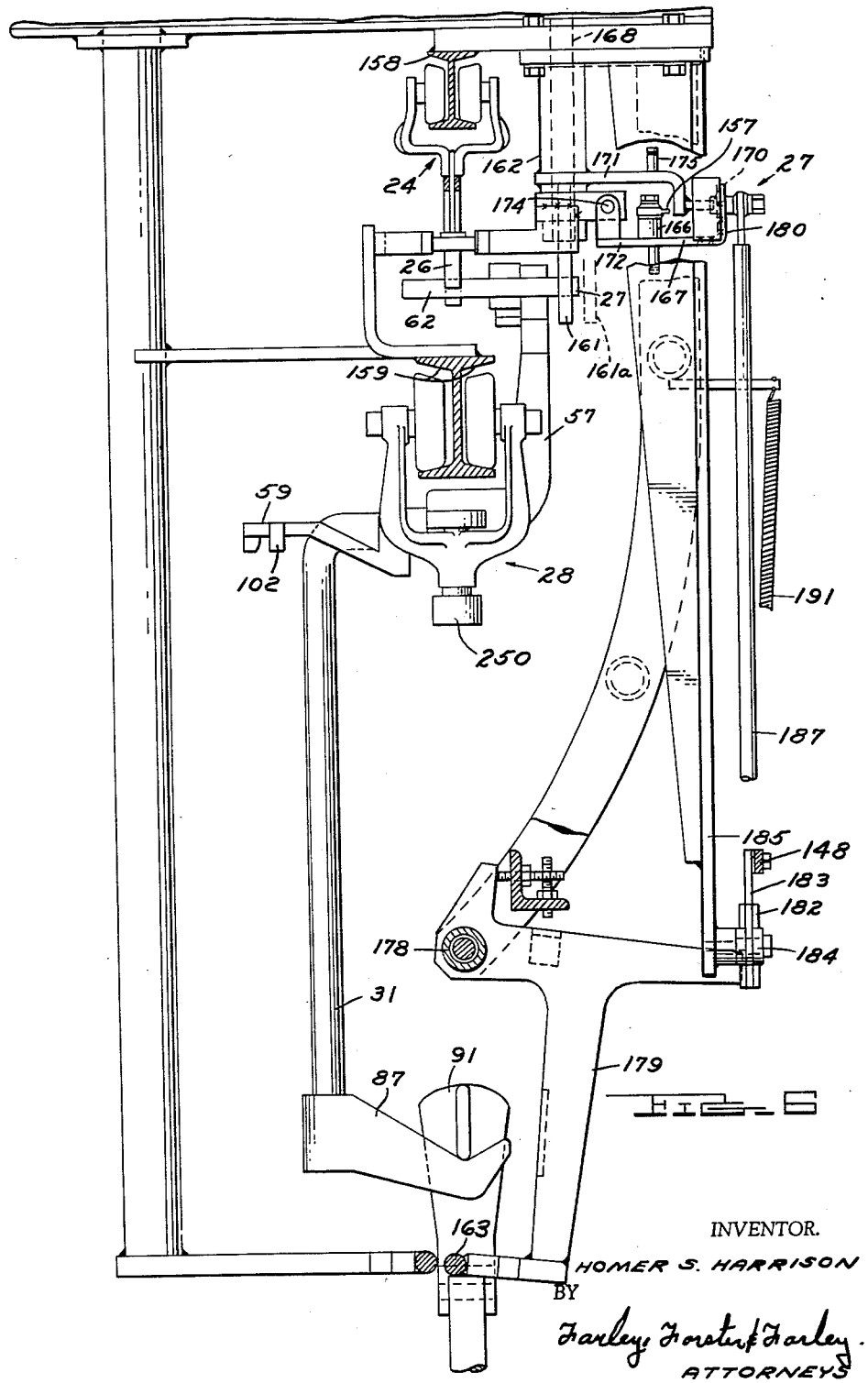

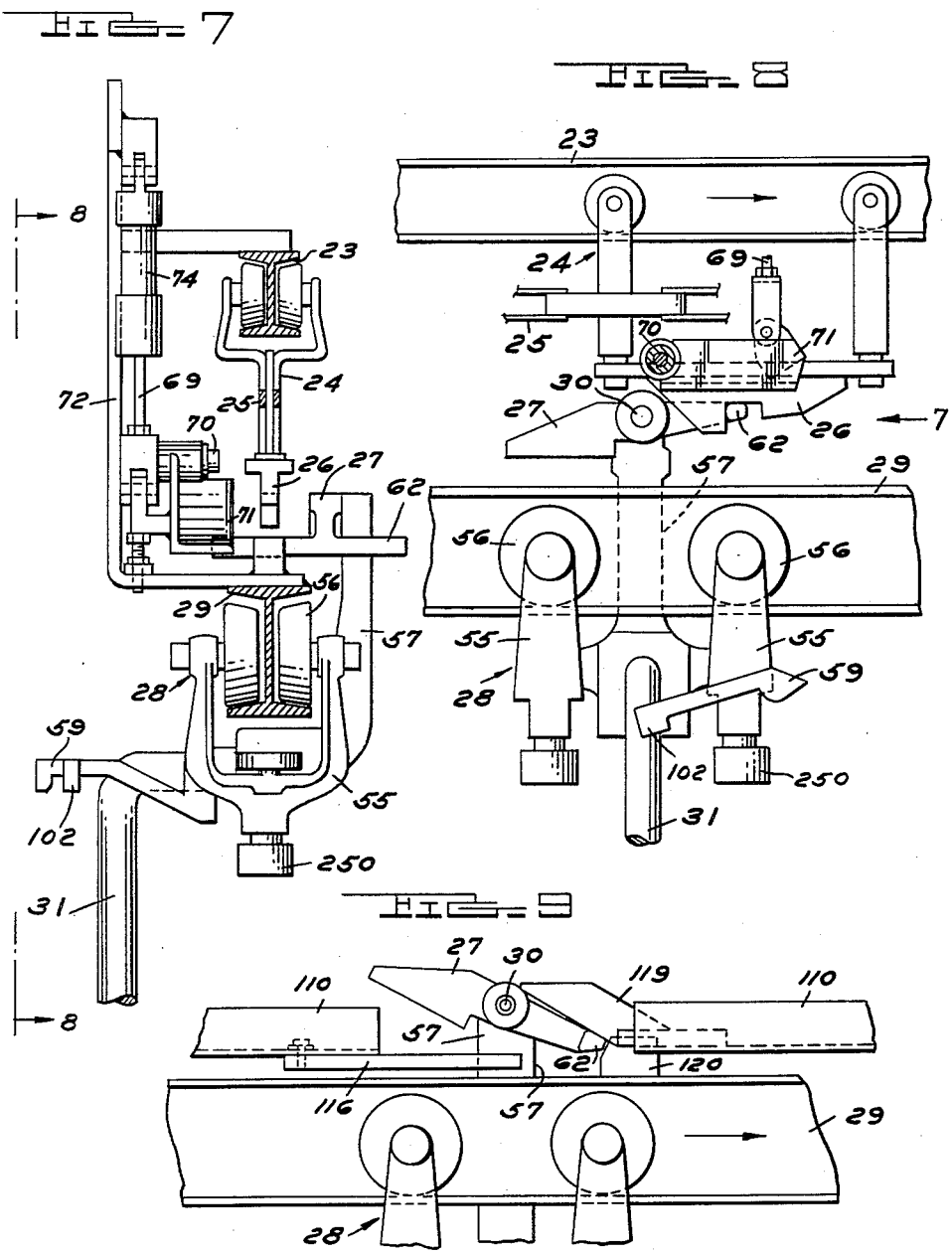

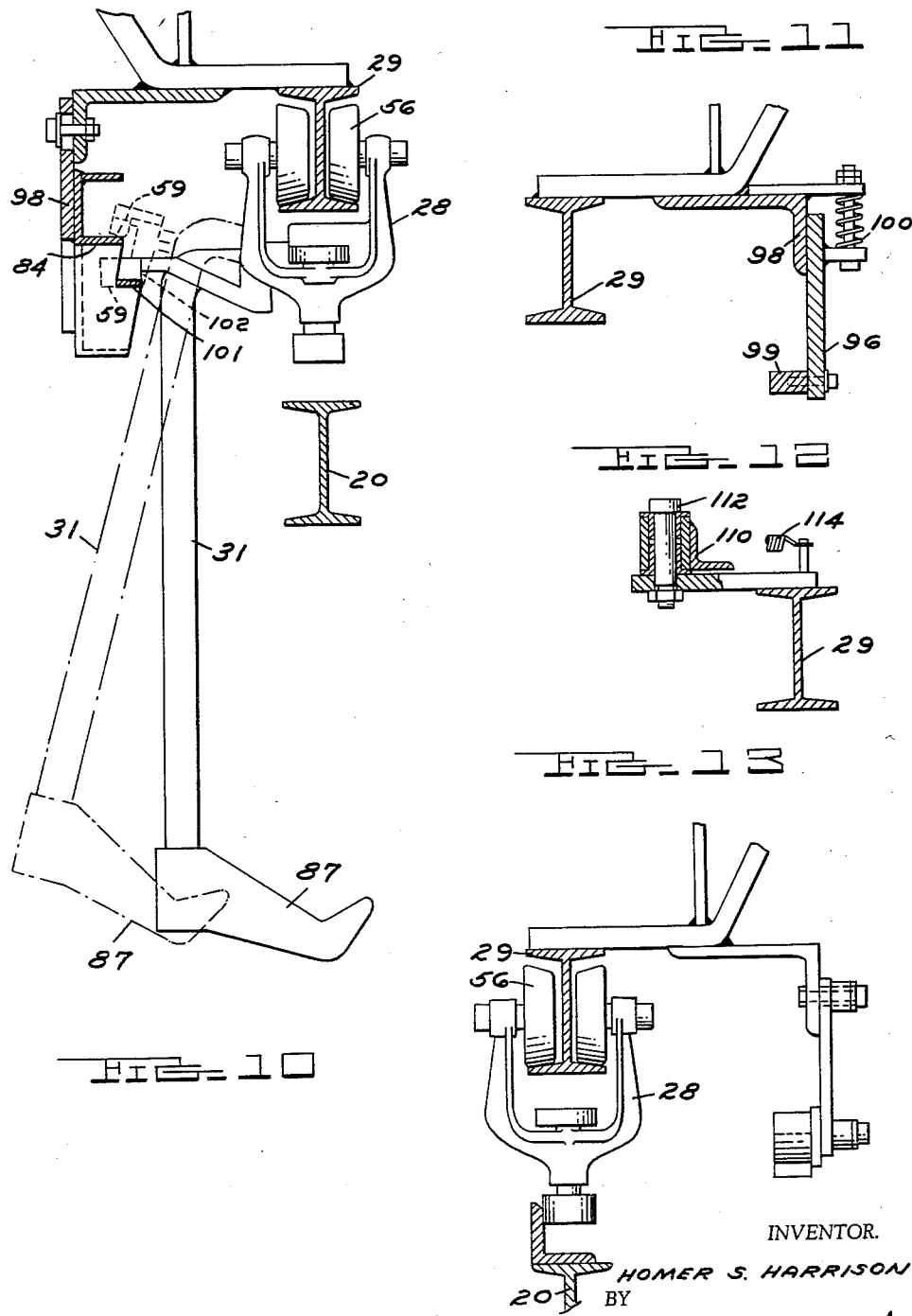

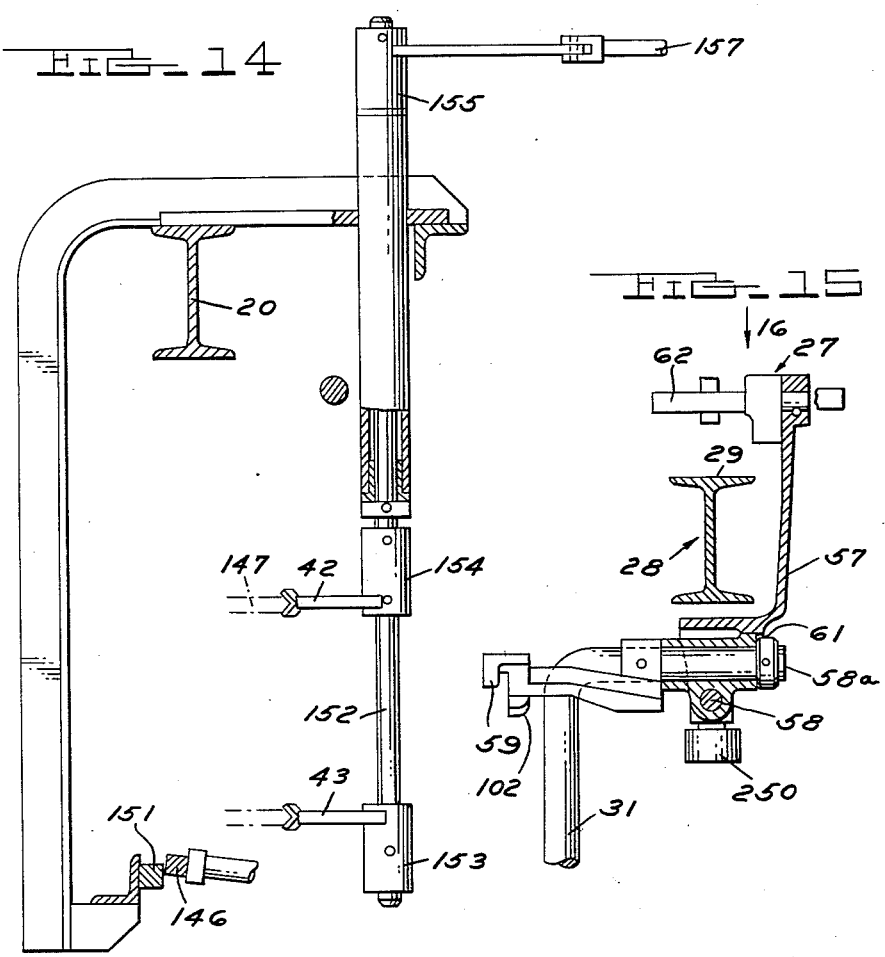

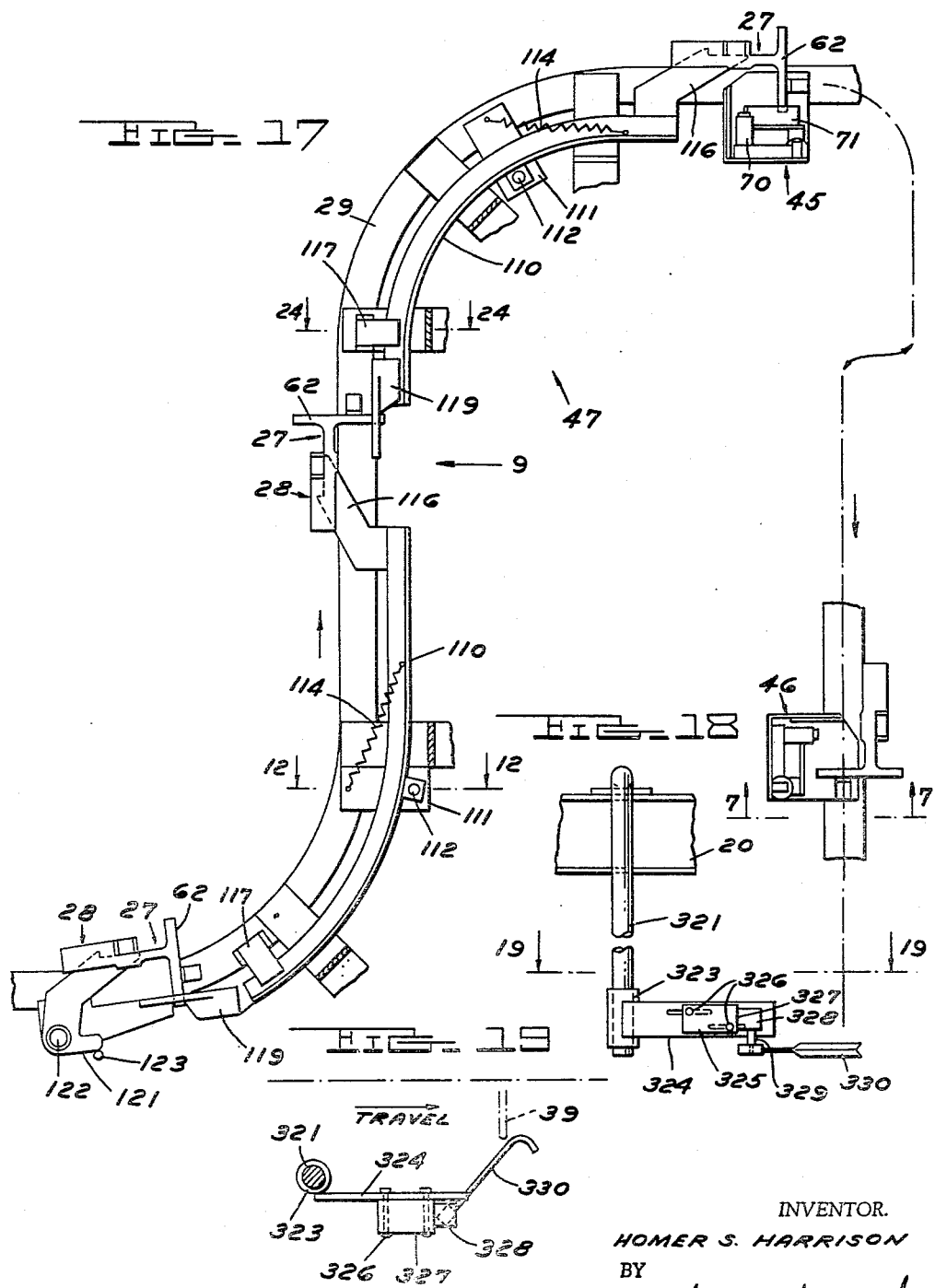

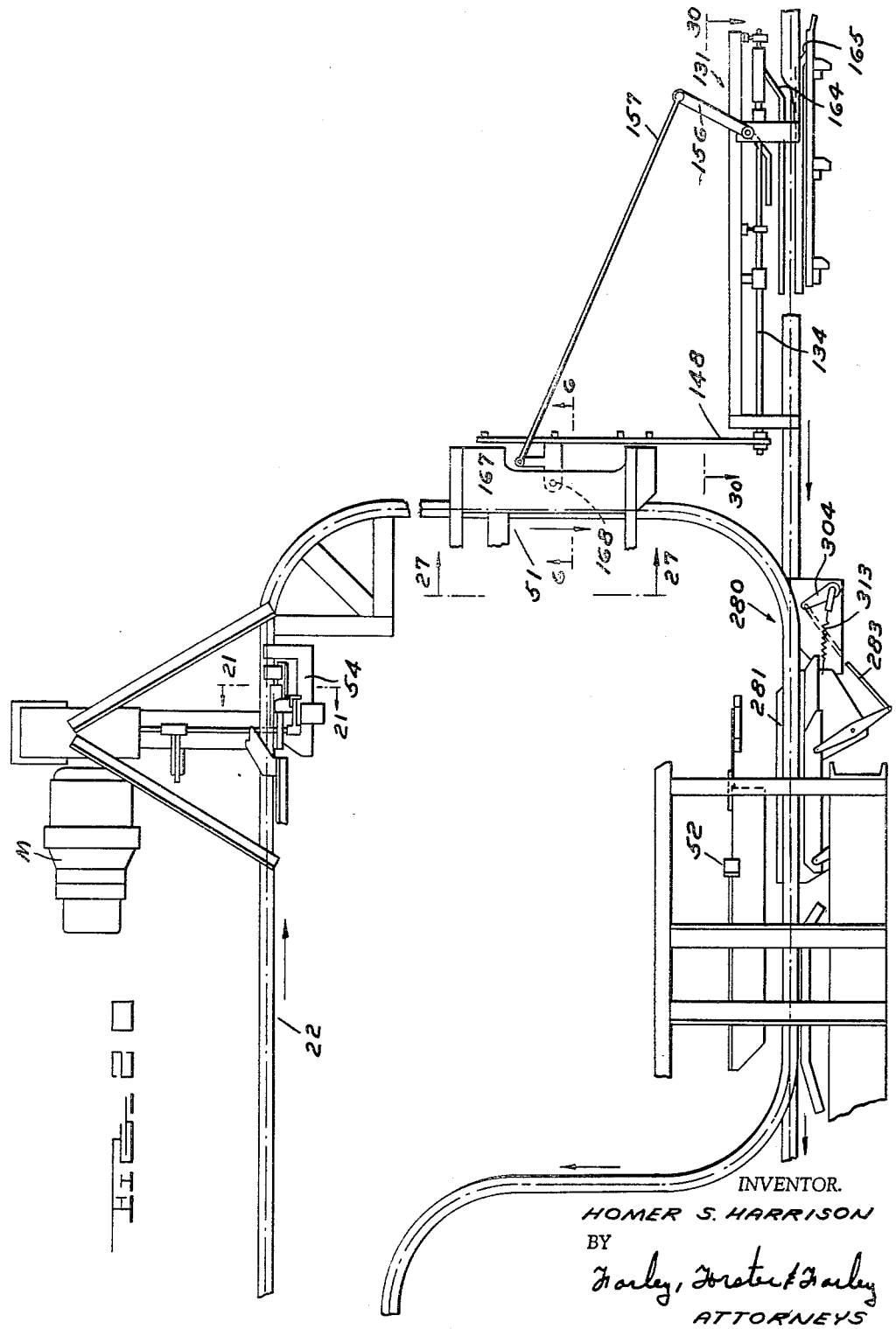

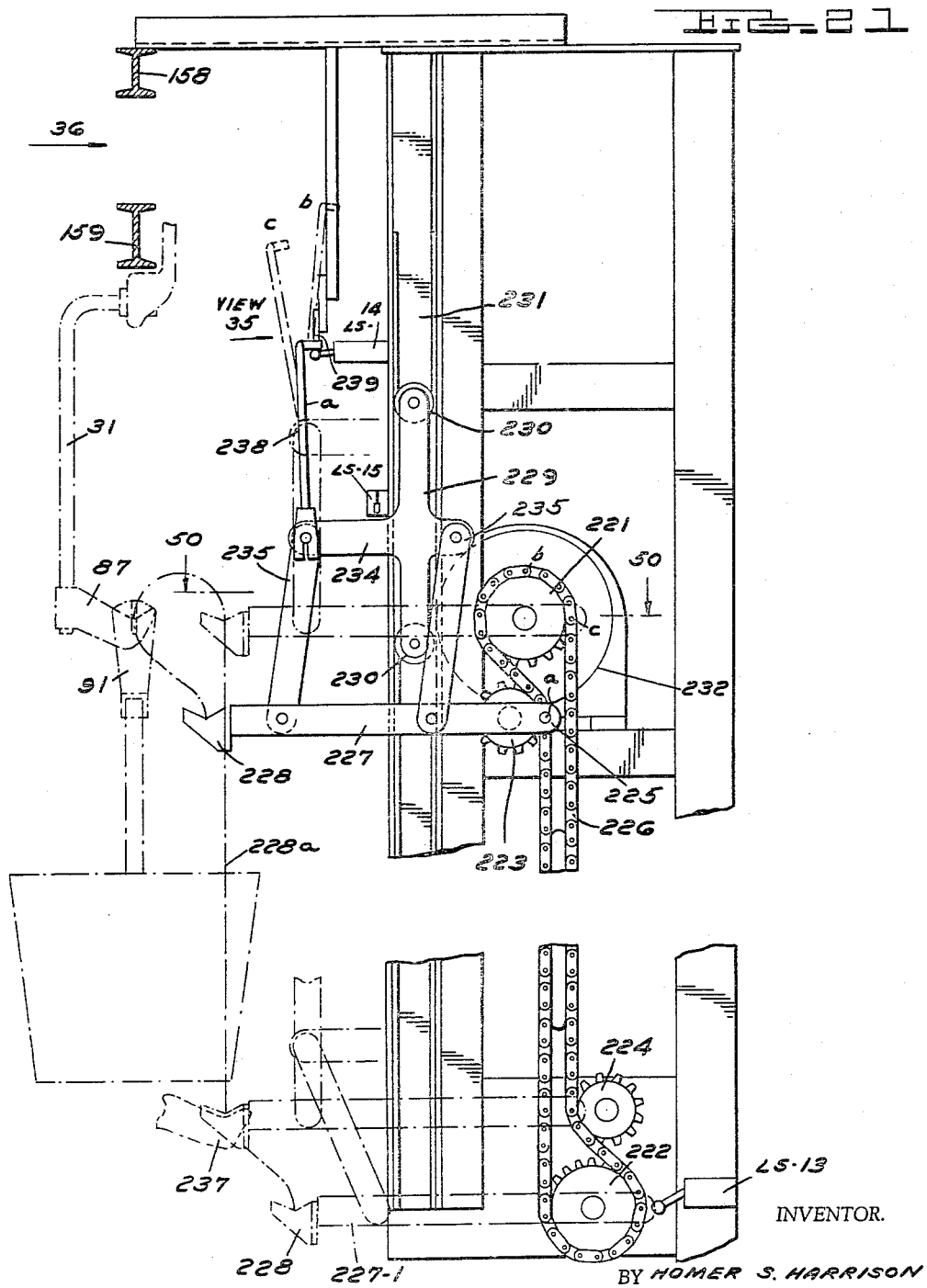

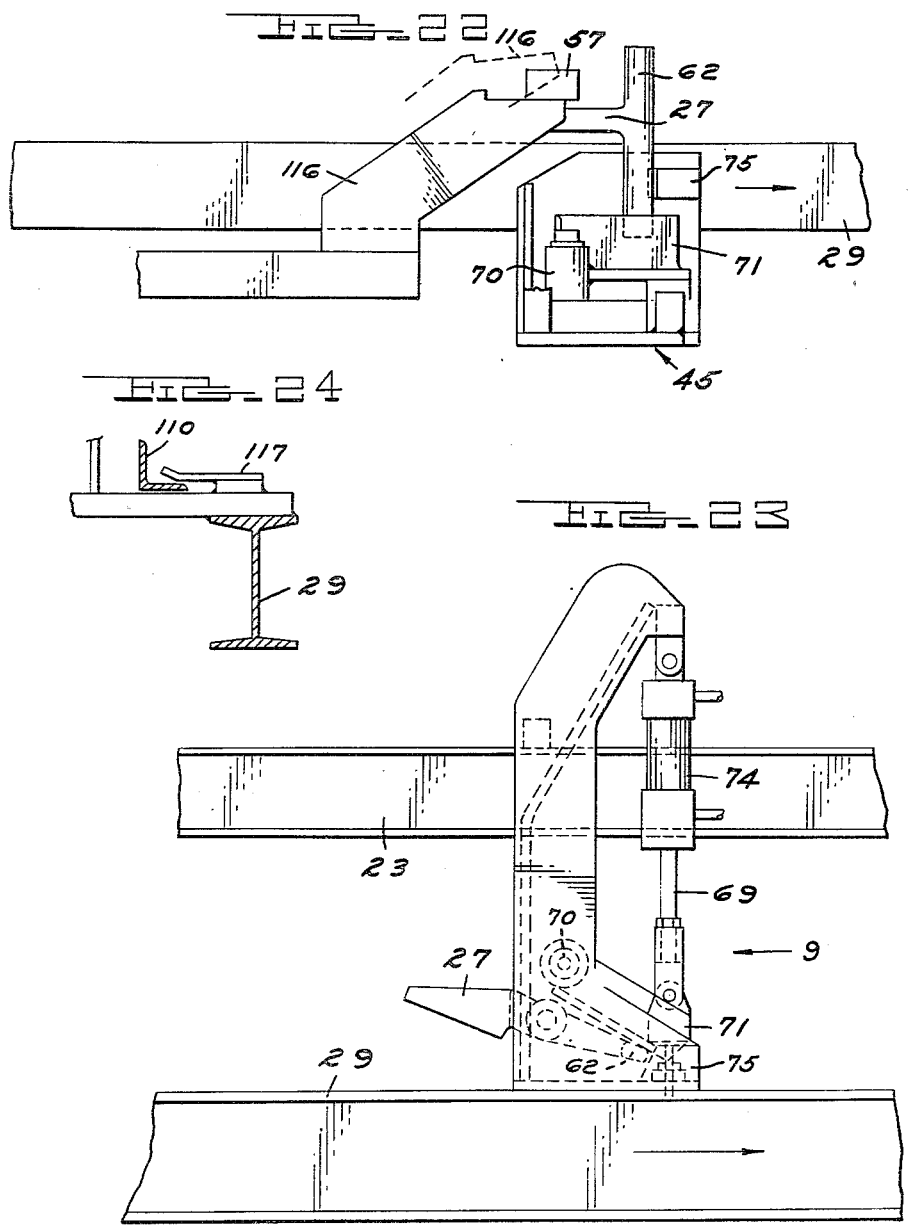

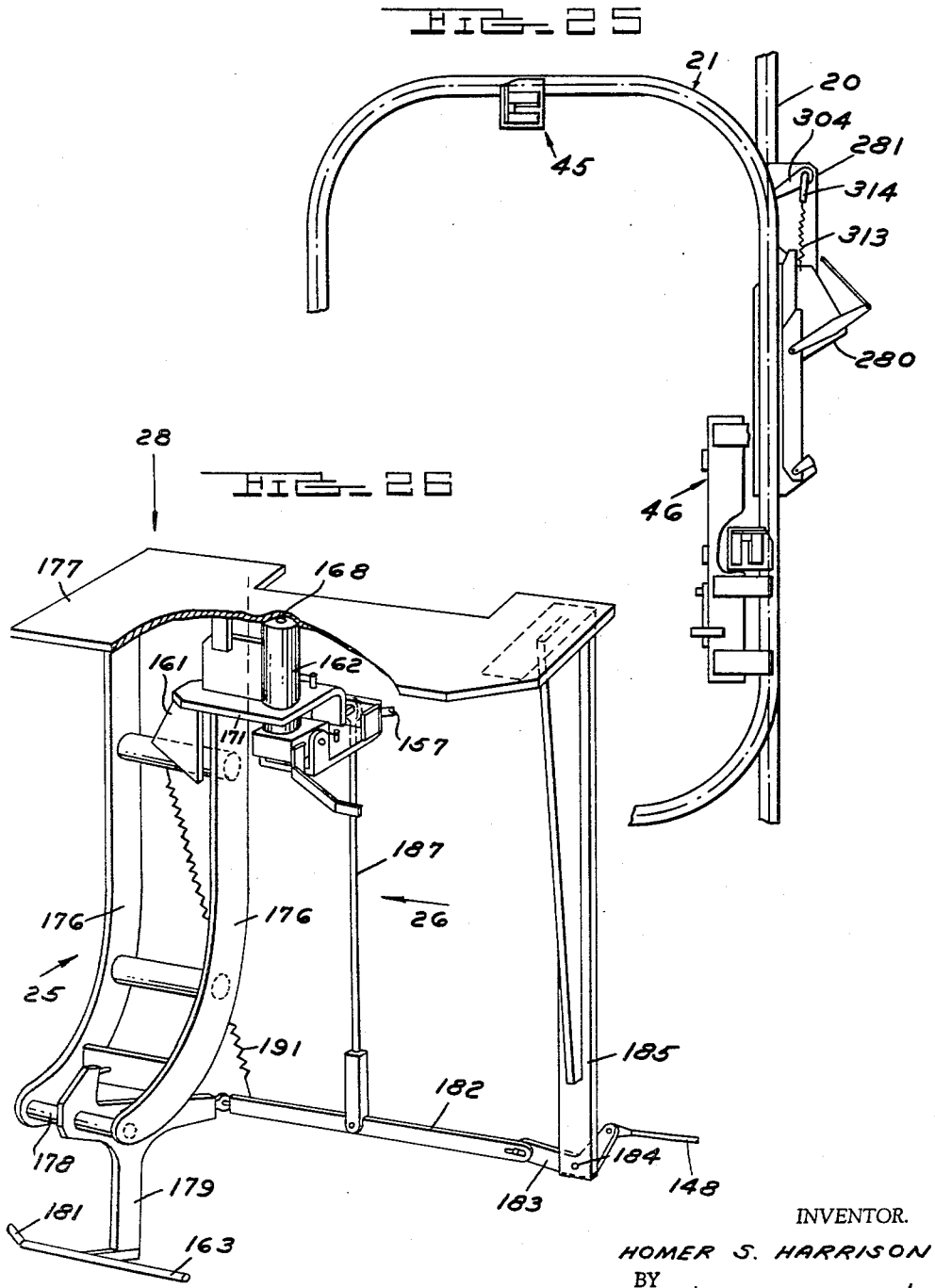

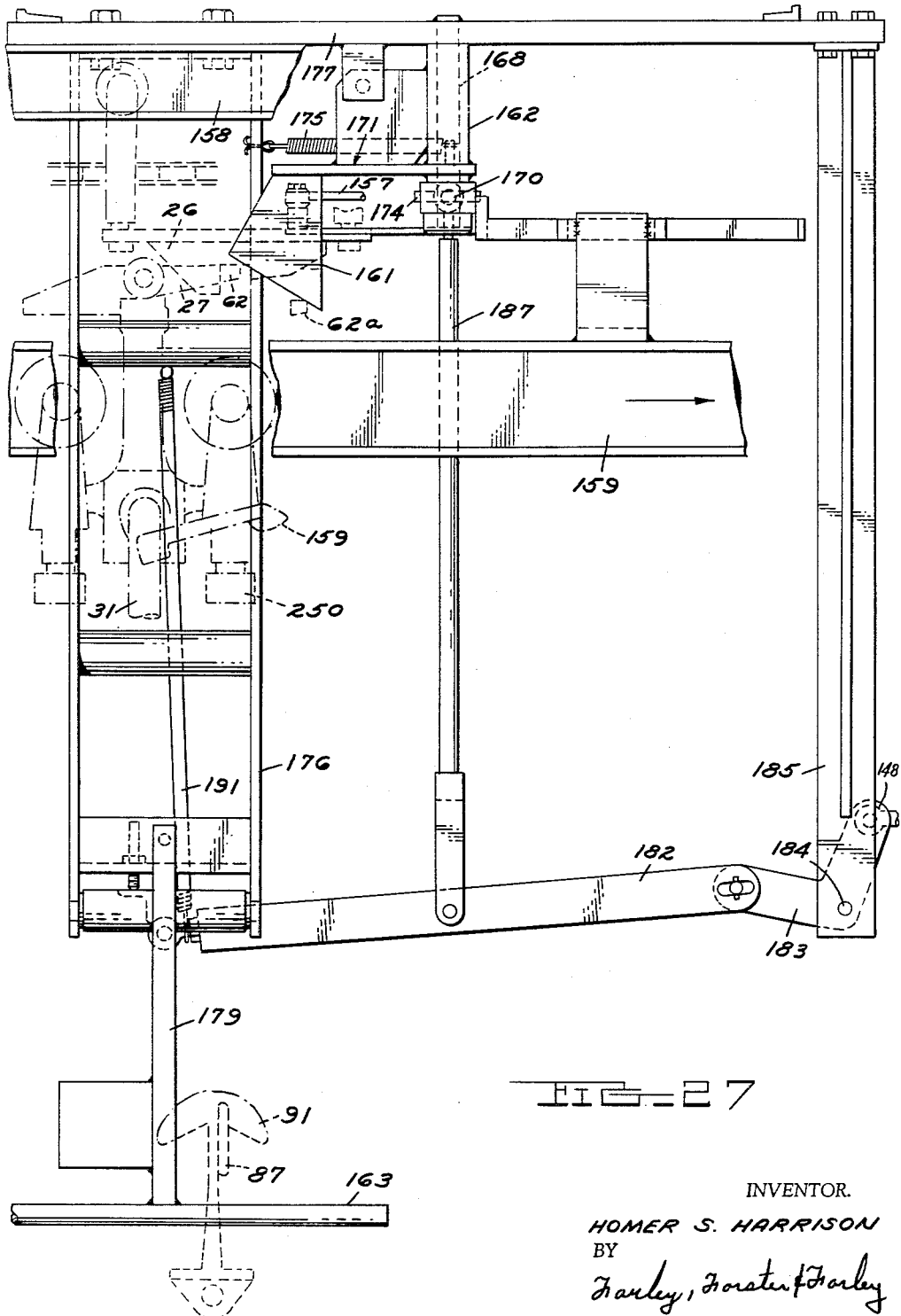

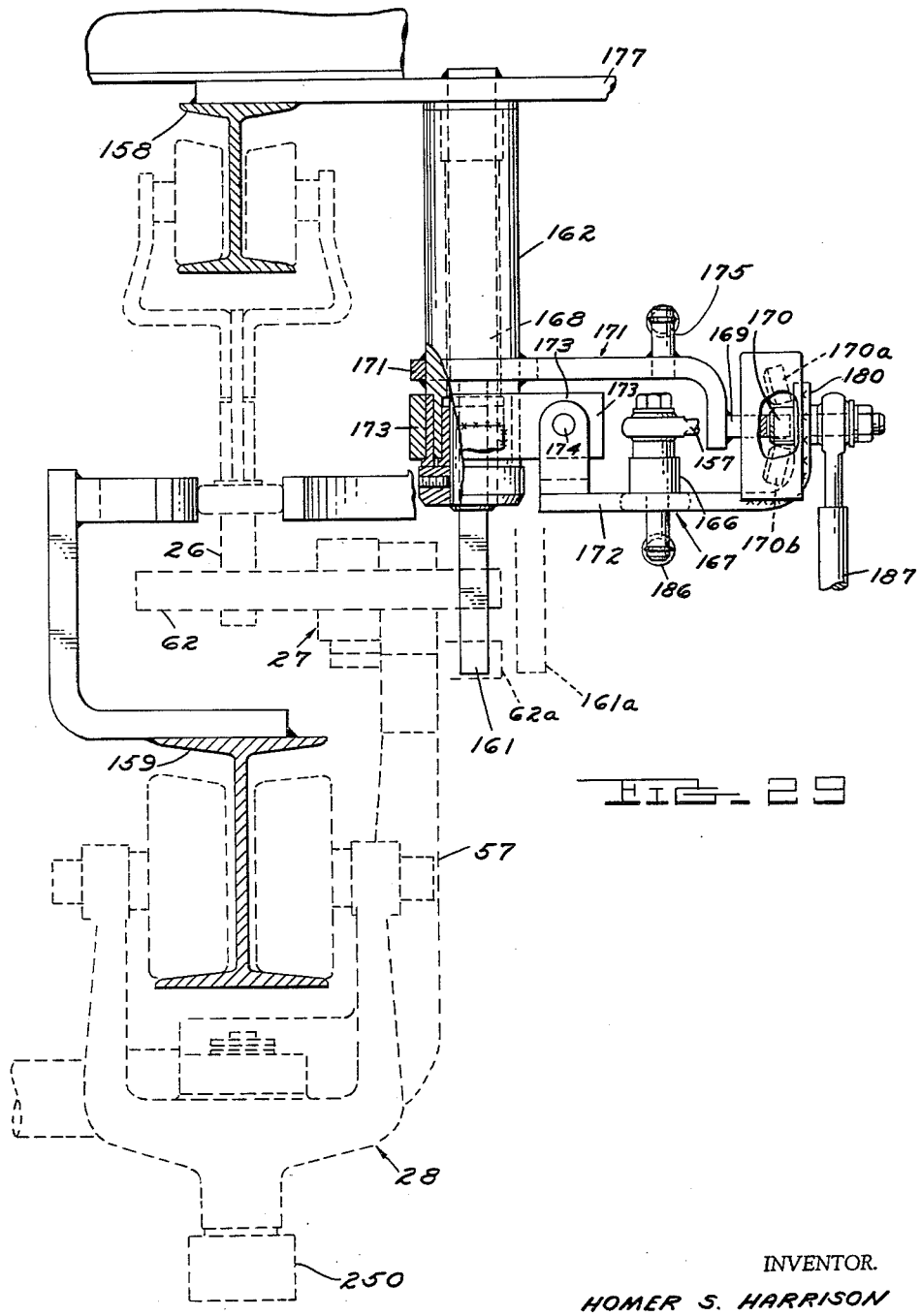

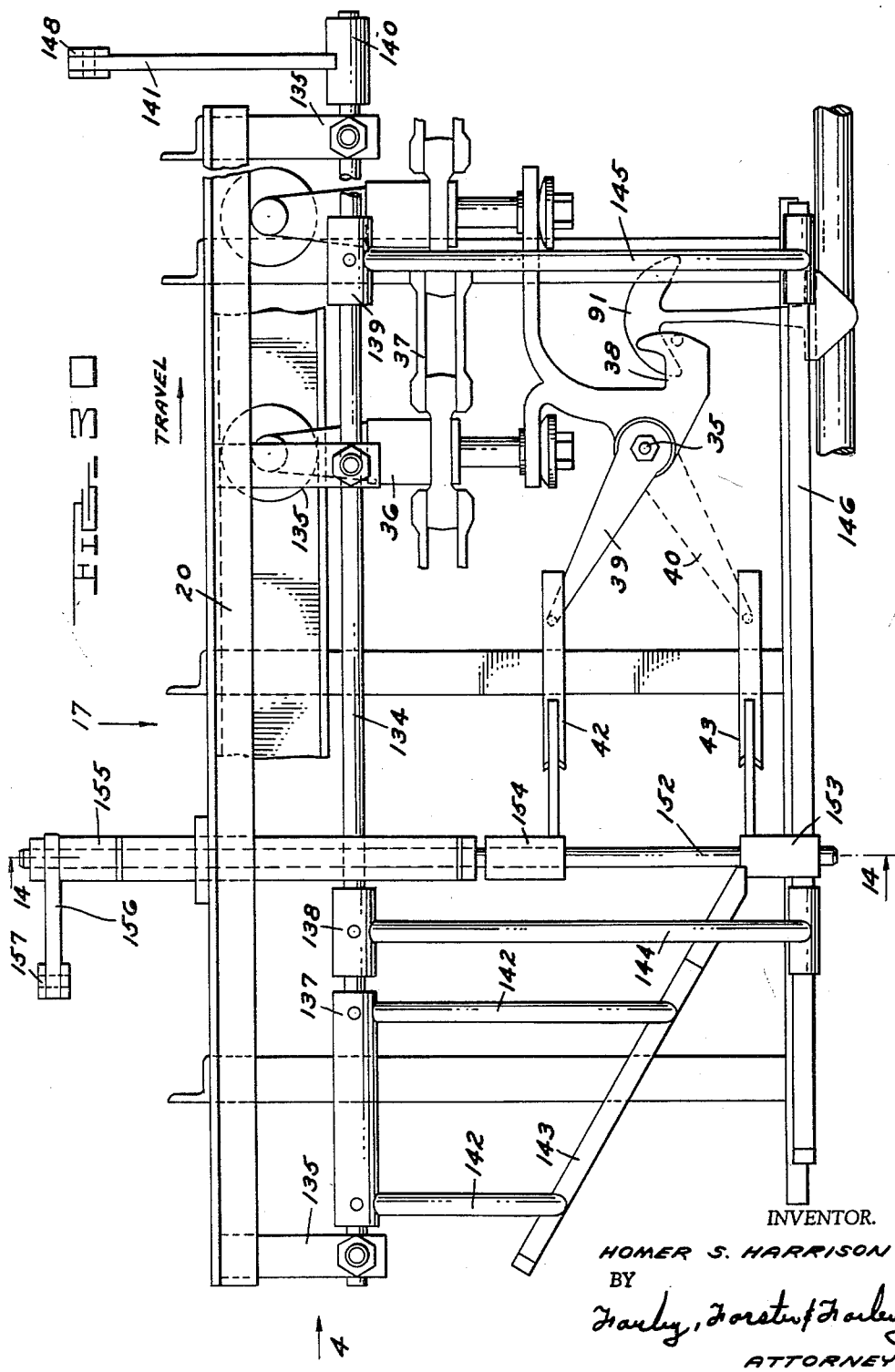

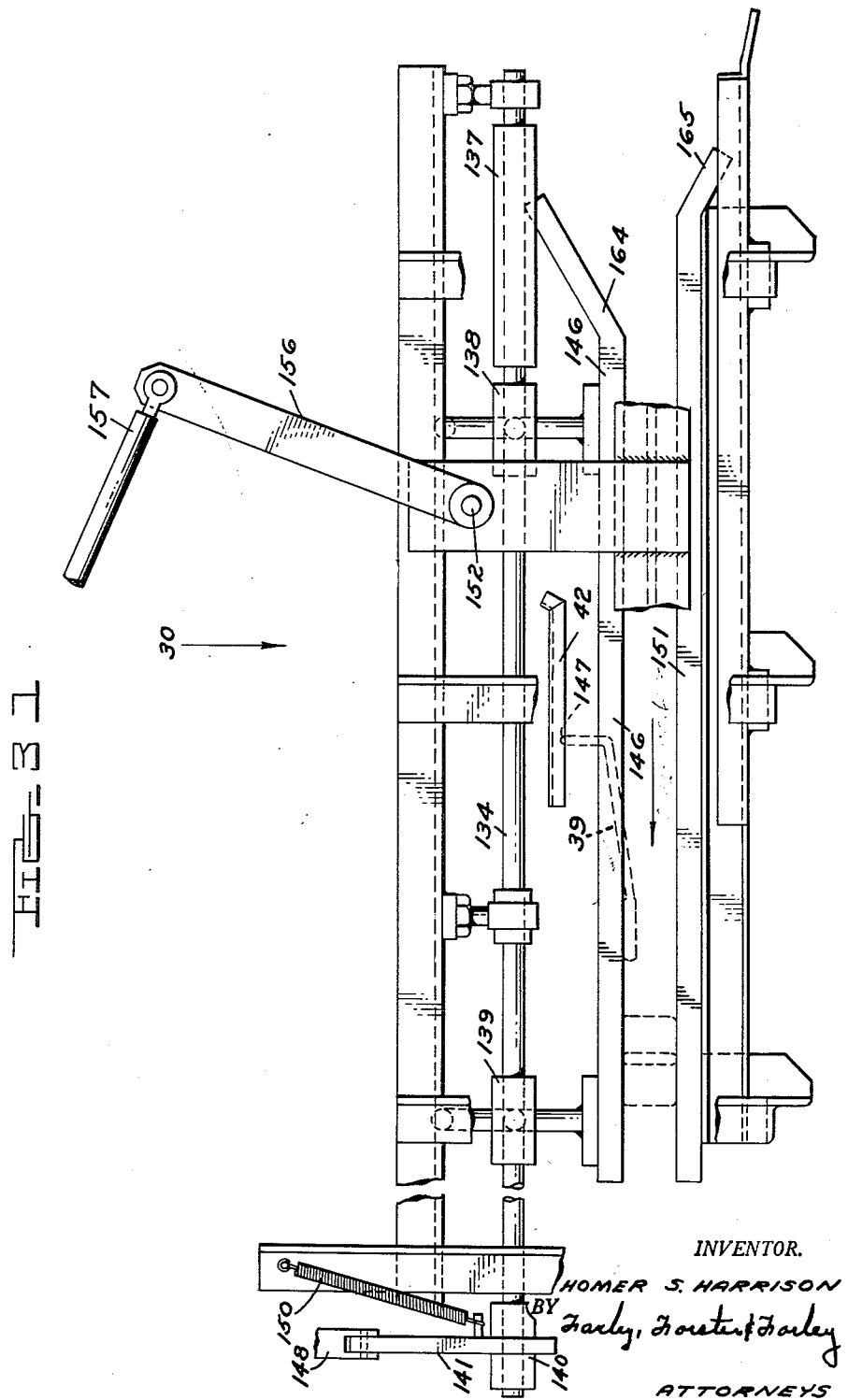

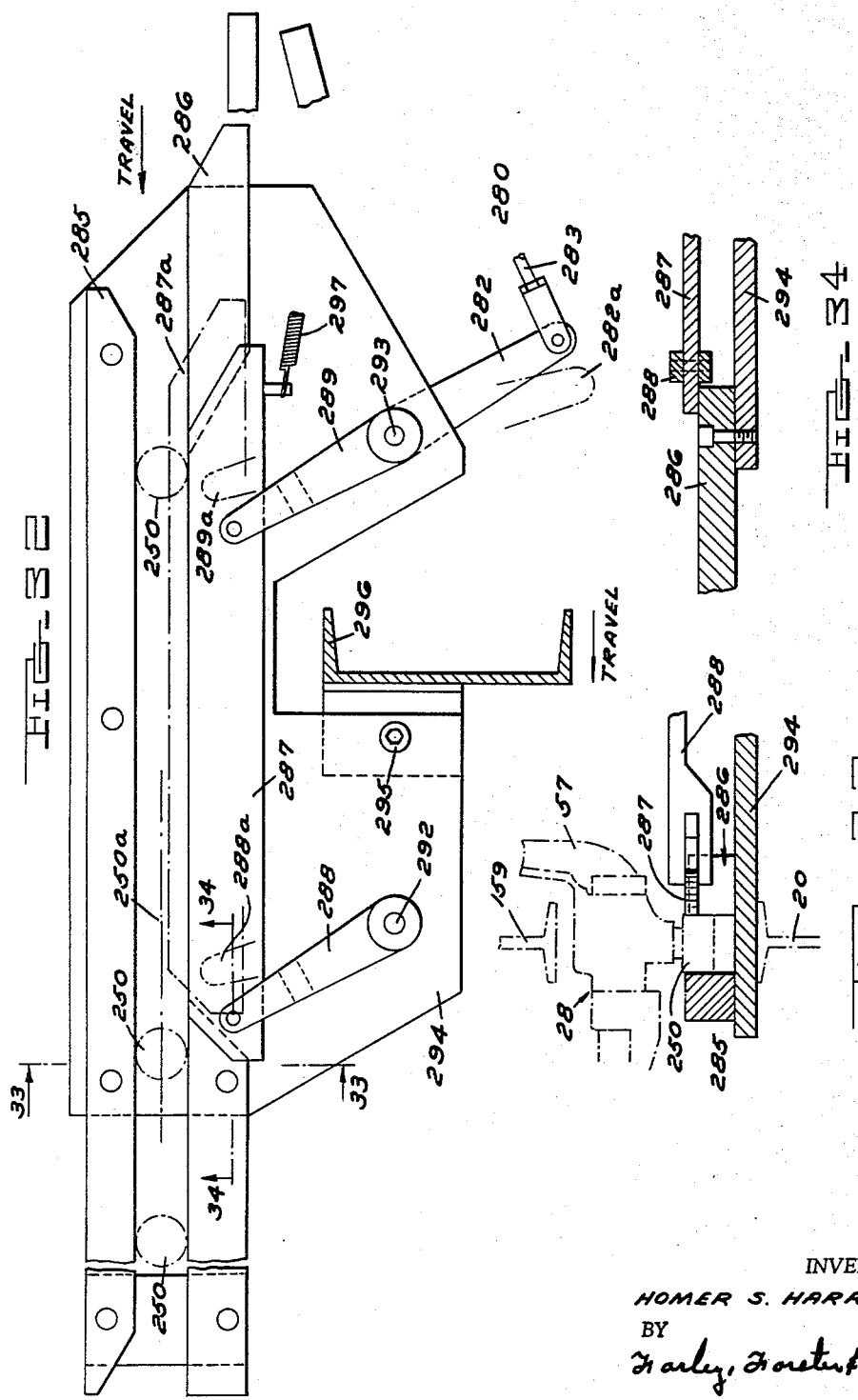

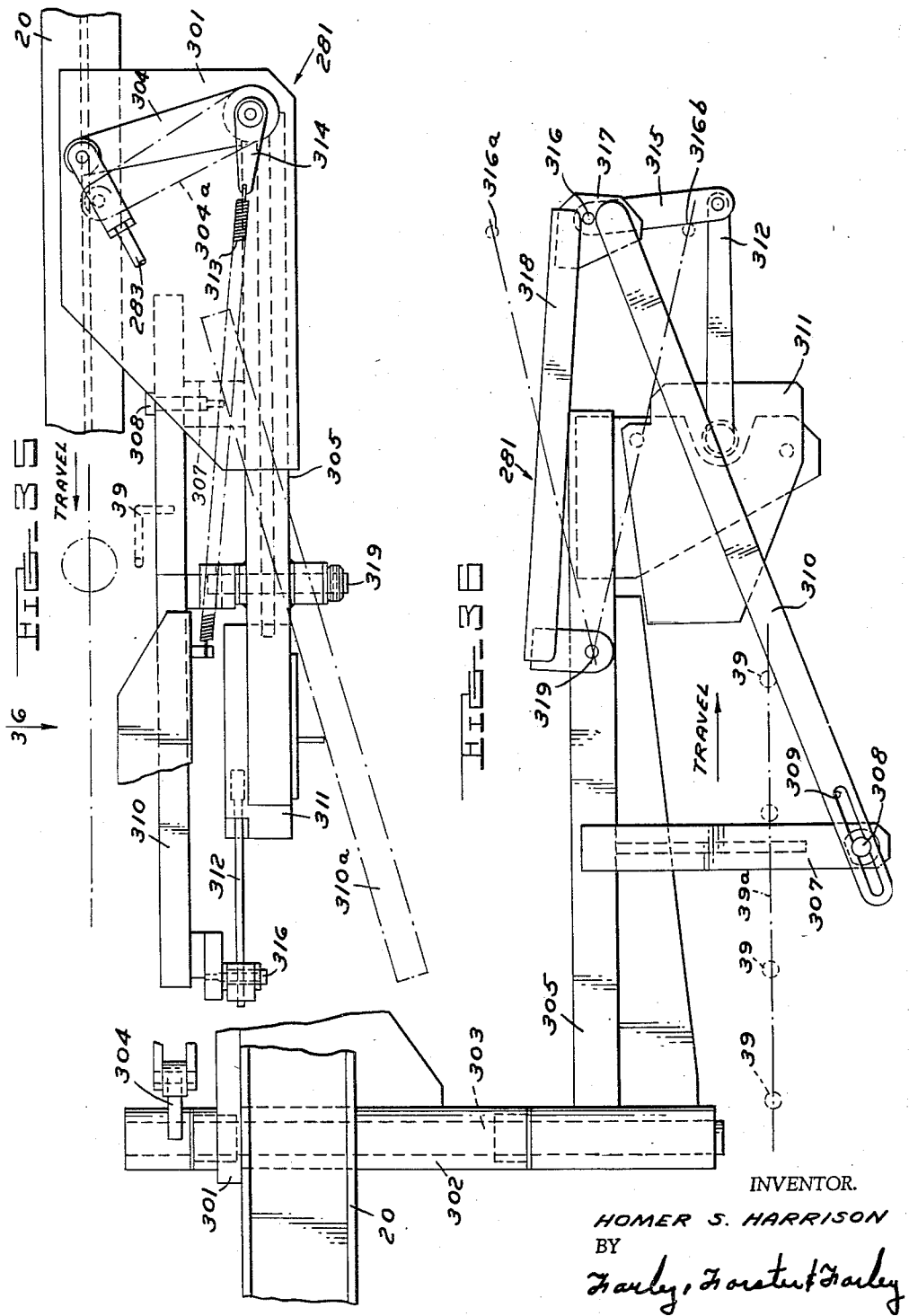

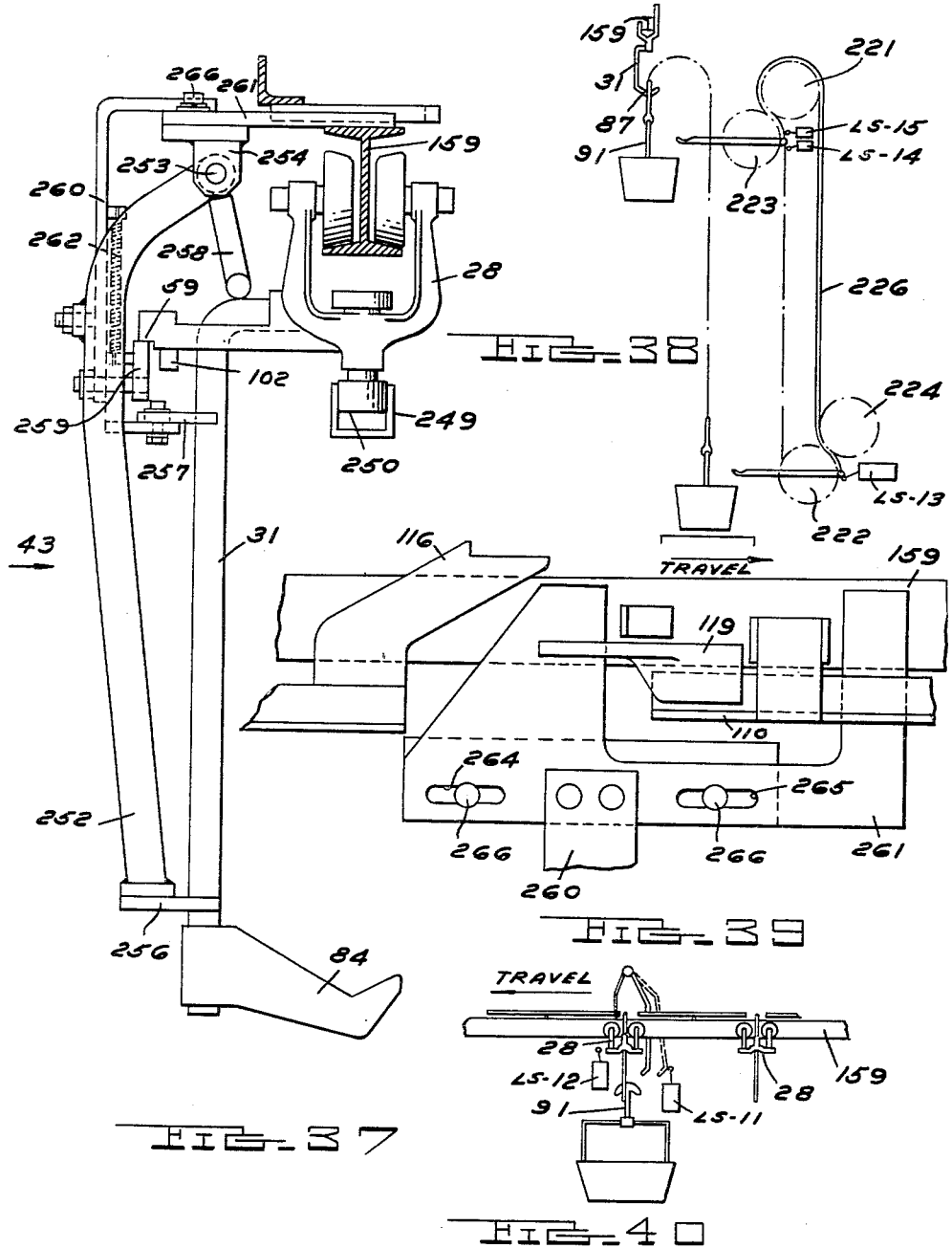

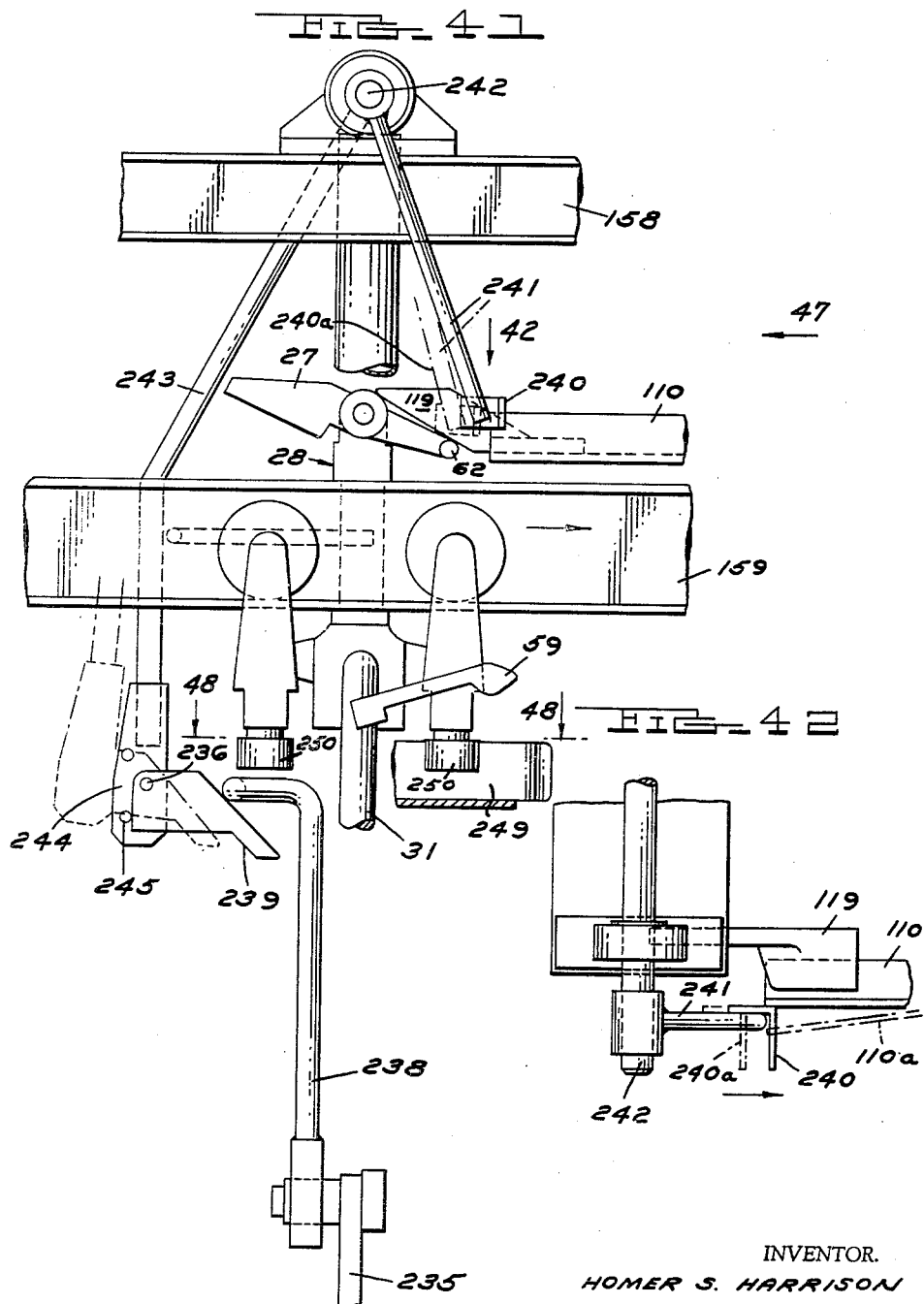

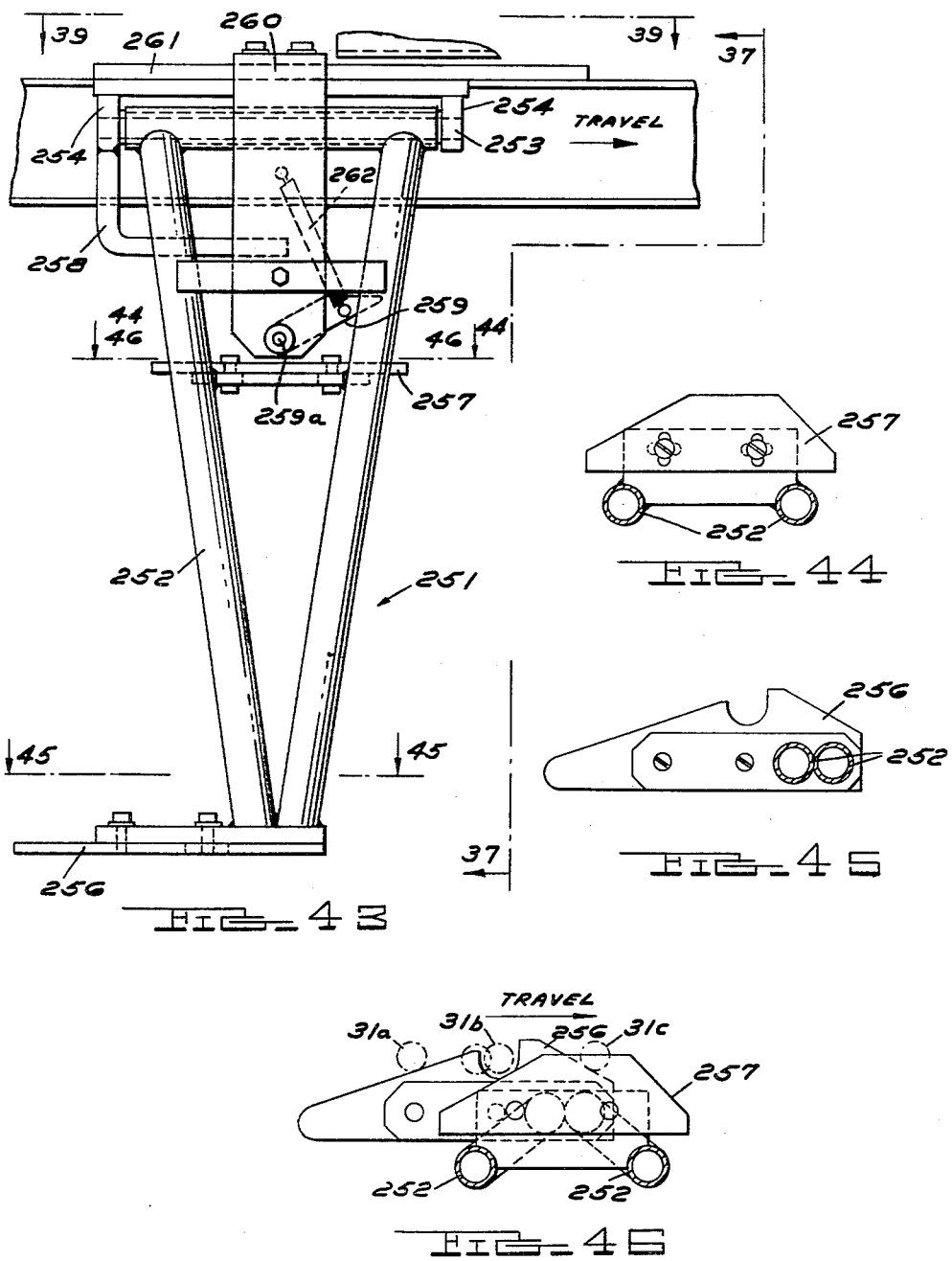

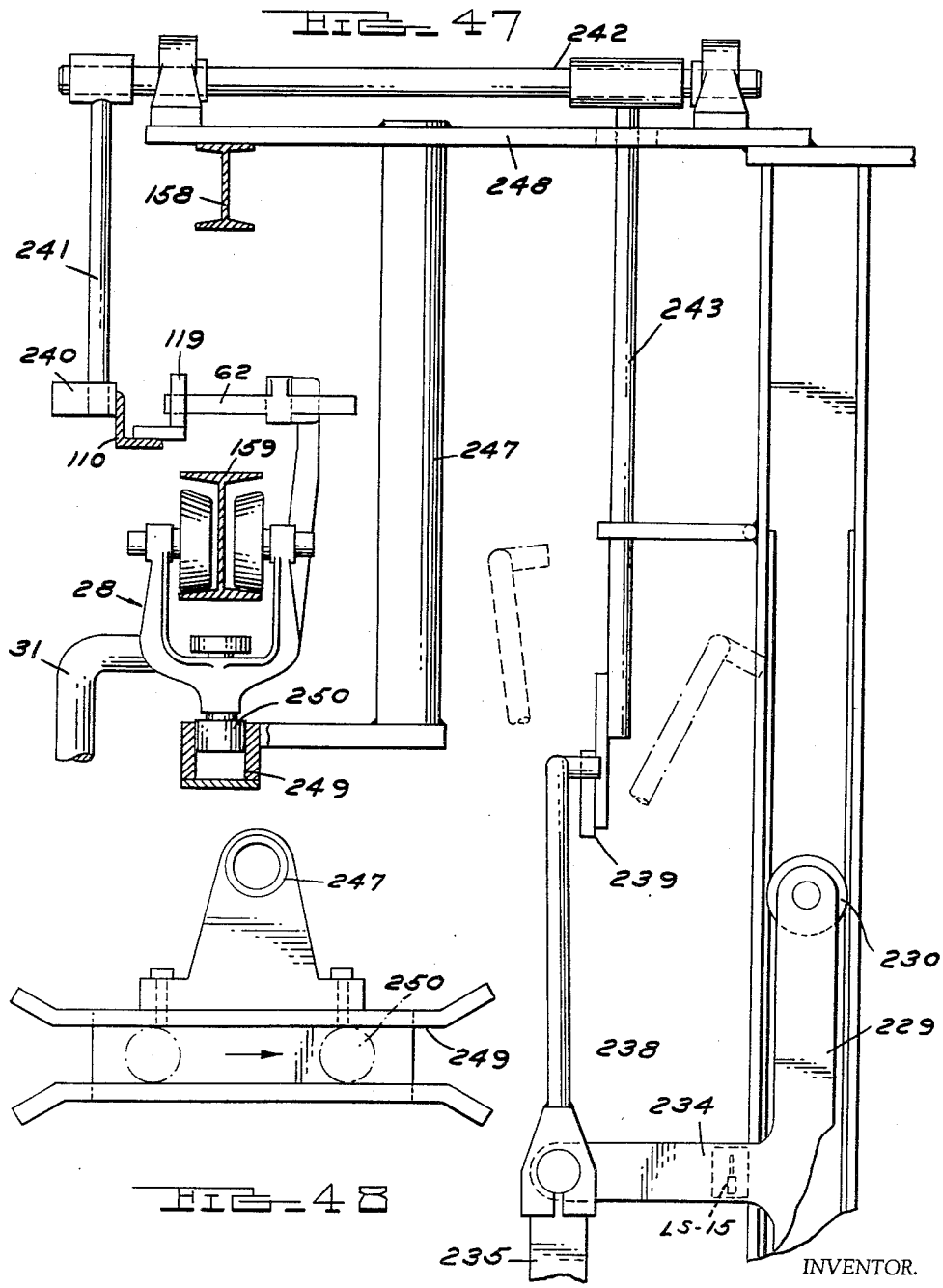

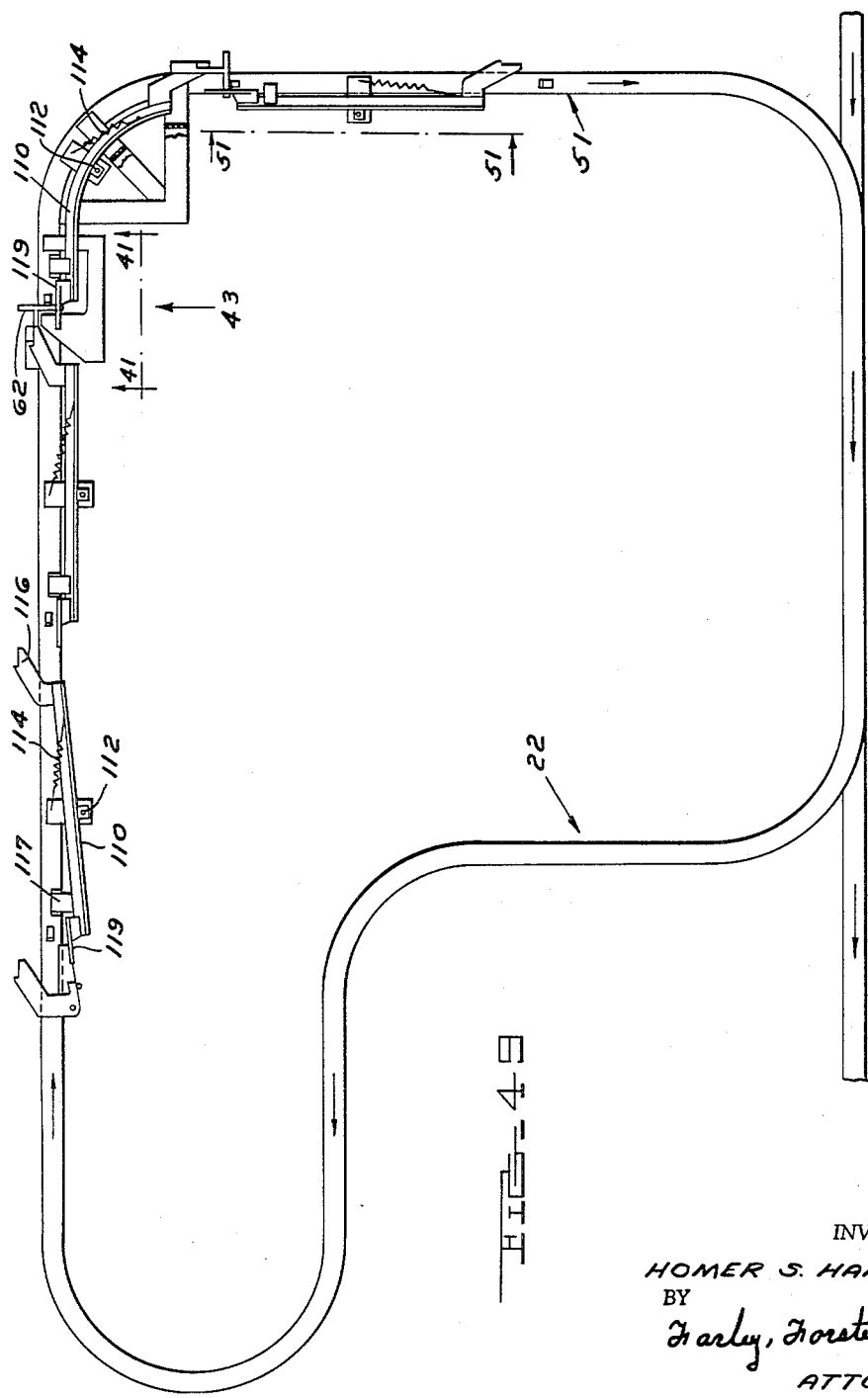

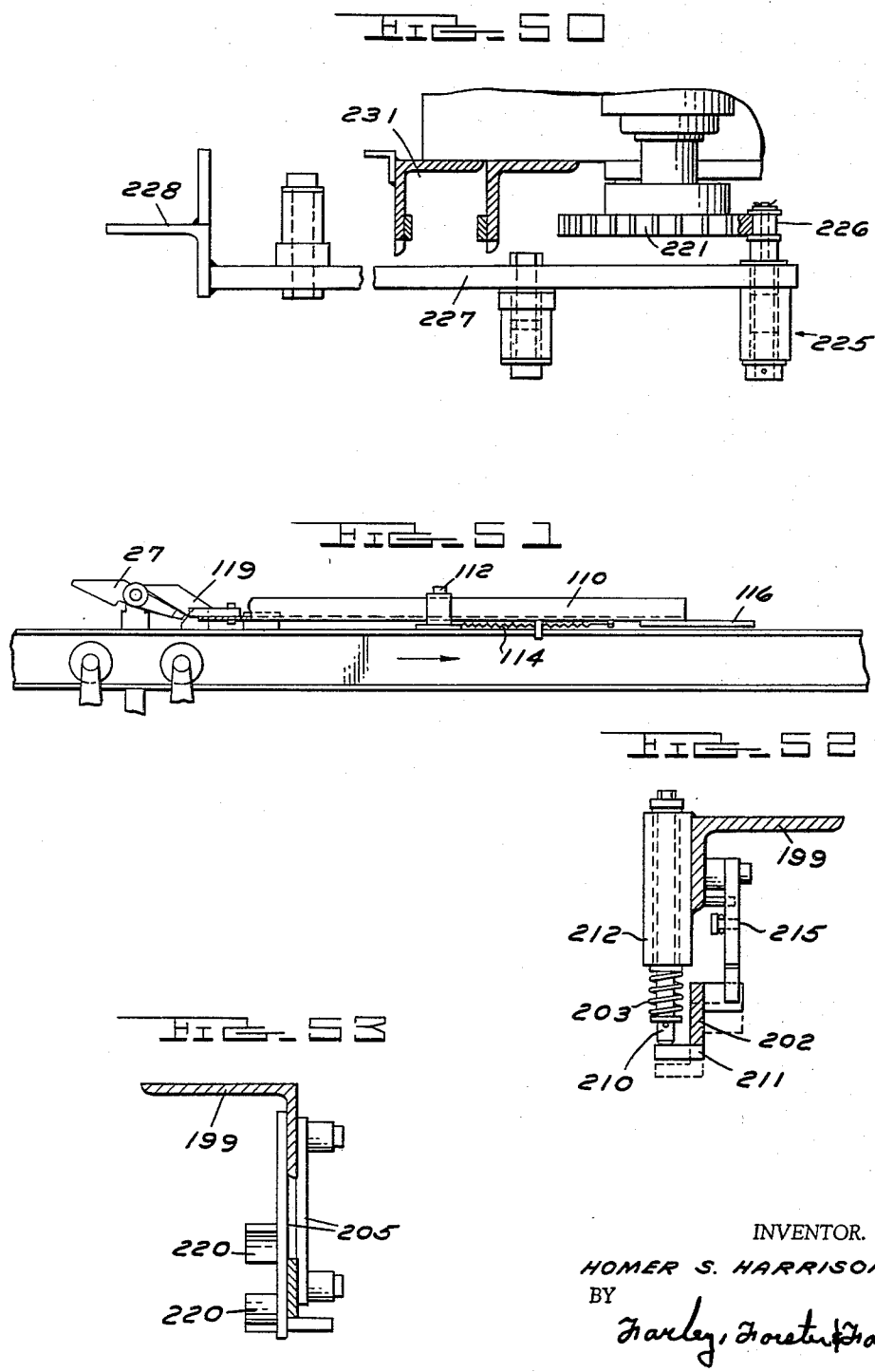

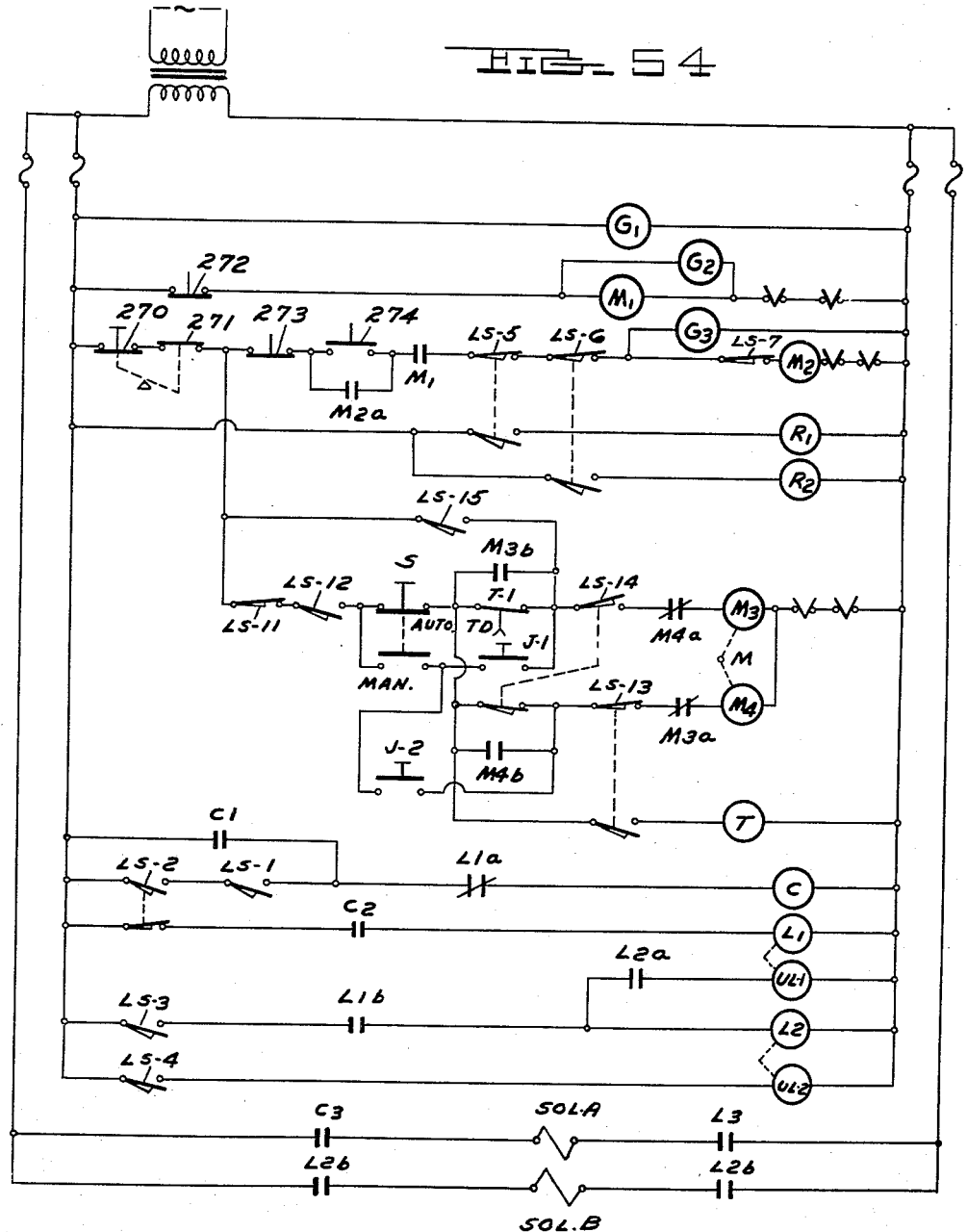

United States Patent Office 2,940,400
Patented June 14, 1960

2,940,400

AUTOMATIC SELECTIVE DISPATCH AND TRANSFER CONVEYOR SYSTEM

Homer S. Harrison, Lathrup Village, Mich., assignor to Allied Steel and Conveyors, Division of The Sparton Corporation, Jackson, Mich., a corporation of Ohio Filed Feb. 28, 1958, Ser. No. 718,286

30 Claims. (Cl. 104—88)

This invention relates to an automatic selective dispatch and transfer conveyor system and more particularly to a system employing an endless main line overhead conveyor and a plurality of endless branch work loop overhead conveyors with means for effecting work load transfer therebetween as well as for automatically dispatching loads from any work loop selectively to any other work loop, transferring as required to and from the main line conveyor.

The preferred embodiment disclosed herein employs continuously power chain driven trolleys on the main line conveyor having load bars engageable by transferable load hooks; free trolleys on the work loop conveyors releasably driven by a continuously running pusher chain driven synchronously by power take-off from the main line conveyor, such free trolleys having load hangers also engageable by the transferable load hooks; transfer stations at junctures of main line and work loop conveyors where transfer of load hooks may be effected automatically through relative change in level of the respective conveyor tracks; cam positioned load designation arms on the main line load trolleys adapted to identify the predetermined destination of a load transferred to a main line trolley from any work loop and to initiate selectively a transfer to such destination work loop; and elevator means for transferring automatically a load hook from a free trolley load hanger to a work station and from such work station back to the free trolley load hanger.

Two alternative systems are disclosed for coordinating the sequence of in and out load transfers at a work loop. One operates on a regular sequential principle of alternating in and out loads, etc., all outgoing free trolleys being in a loaded condition. A loaded free trolley is disengaged from the pusher chain drive and held at a ready station in the work loop conveyor track until an empty main line trolley approaches whereupon the pusher chain re-engages drive of the loaded free trolley moving it to the transfer station; after a load is transferred from a free trolley to a main line trolley, the then empty free trolley waits at the transfer station for a main line load designated for that work loop whereupon the load is transferred to such free trolley and the work loop. In the other system loaded and unloaded free trolleys circulate on a work loop conveyor track without any necessary regular sequence and the loaded or unloaded condition of a free trolley at a ready station determines the sequence of operation in transferring to or from the main line conveyor.

In each of these systems, means are provided for disengaging the pusher drive of a free trolley at a ready station when proper conditions for a transfer are not present as well as for disengaging the drive of successive free trolleys approaching such ready station, until drive of the leading free trolley is re-engaged for transfer, together with means for re-engaging drive for transfer whenever pre-requisite conditions arise. Each system also includes means for causing a main line load designated for a particular work loop to by-pass such loop if conditions are not proper for a transfer thereto and to circulate on the main conveyor until proper transfer conditions at the designated loop materialize.

Thus, in the first system, referred to as "waiting transfer," a transfer from work loop to line conveyor requires a free trolley at the work loop ready station and an empty trolley on the line conveyor approaching the transfer station while a transfer from line conveyor to work loop requires a designated load on the line conveyor approaching the transfer station and a free trolley waiting at the transfer station; while in the second system, referred to as "moving transfer" a transfer from work loop to line conveyor requires an empty approaching trolley on the line conveyor and a loaded free trolley at the ready station, and a transfer from line conveyor to work loop requires a designated load trolley approaching on the line conveyor and an empty free trolley at the ready station.

In the embodiment disclosed herein, there are three vertically aligned track sections at a transfer station, the uppermost of which carries the work loop pusher chain, the next lower carries the free trolleys, and the lowermost the chain driven line conveyor trolleys. A rise and drop in the line conveyor track at the transfer station are provided to effect a work loop to line conveyor transfer on the upward slope and a line conveyor to work loop transfer on the downward slope. Means are provided in the case of a work loop to line conveyor transfer in the waiting transfer system to disengage the pusher drive of the free trolley at a position intermediate the upward and downward slopes in the line conveyor track to await the next designated load for such work loop, and means are provided in the case of a work loop to line conveyor transfer in the moving transfer system to deflect the free trolley load hanger away from load transfer position in the downward slope area of the line conveyor track in order to avoid re-transfer of the same load from line conveyor to free trolley after the initial transfer to the line conveyor in the upward slope area.

In the waiting transfer system, six possible conditions must be provided for at the juncture of line conveyor and work loop arising from the three possible conditions of approaching main line conveyor trolley (($a$) designated load, ($b$) non-designated load, and ($c$) empty) and two possible conditions of the work loop ((1) with or (2) without free trolley waiting at the transfer station), $a$–1 and $c$–2 representing relatively compatible transfer conditions of respective main and branch trolleys requiring transfer while the other possible combinations represent relatively incompatible transfer conditions requiring delay in transfer. The condition of the approaching line conveyor trolley is sensed by a pair of limit switches one of which is responsive only to an empty trolley and the other responsive only to a designated load trolley. The condition of the work loop is sensed by a limit switch at the ready station actuated by a free trolley and by a limit switch momentarily actuated by a free trolley leaving its waiting position at the transfer station. Solenoid controlled cylinders at the ready station and the transfer station control engagement and disengagement of the free trolley drive. Through these elements an approaching empty trolley on the line conveyor initiates the drive engagement of a free trolley at the ready station resulting in an automatic work loop to line conveyor transfer and a designated load trolley approaching on the line conveyor initiates the drive engagement of a free trolley waiting at the transfer station resulting in a line conveyor to work loop transfer.

In the moving transfer system, mechanical interlock linkage operated by an approaching line conveyor trolley effects drive engagement of a free trolley at the ready station under either of two conditions relatively compatible transfer: (a) a designated load on the line conveyor together with an empty free trolley at the ready station or, (b) an empty trolley on the line conveyor together with a loaded free trolley at the ready station.

The system employed for load identification and selective dispatch comprises pivoted trailing indicating arms carried on the line conveyor trolley load bars positionable by cam surfaces along the path of the line conveyor to any of a plurality of distinguishable levels, such arms being capable of actuating limit switches located at corresponding levels at the approach to a work loop, in the case of the waiting transfer system, or of actuating the mechanical interlock linkage in the case of the moving transfer system. Empty line conveyor load bars are identified by one position of the indicator arms; a variable cam surface at the transfer station, operative only when a free trolley is moving through, identifies the load transferred from a work loop to such empty line conveyor load bar for a predetermined destination; and following a transfer at such destination, means are provided for re-positioning the indicator arms to empty position.

The elevator system includes means for disengaging drive of a free trolley at the elevator station and a limit switch actuated by the free trolley initiates the elevator cycle. A load hook on the free trolley is removed by an arm on the elevator mechanism and transferred to a work station level; a timer delays return of the arm to permit load removal and replacement by manual or automatic means, whereupon the replacement load is transferred to the waiting empty free trolley which initiates re-engagement of the free trolley drive and its movement out of the elevator station actuates a limit switch controlling restoration of the means for disengaging drive at the elevator station to its initial operative position.

A more complete description of the constructional and operational features of this preferred embodiment is made below with reference to drawings wherein:

Figure 1 is a schematic plan view of a demonstration conveyor unit incorporating typical waiting transfer and moving transfer work loops as well as a typical elevator station;

Figure 2 is a side elevation of the transfer station for the waiting transfer work loop referred to in Figure 1;

Figure 3 is a side elevation of the transfer station for the moving transfer work loop referred to in Figure 1;

Figure 4 is an end elevation of the main line conveyor in an area approaching the transfer station of the moving transfer work loop showing certain of the mechanical interlock mechanism actuated by a loaded trolley taken along the arrow 4 of Figure 30;

Figure 5 is a view similar to Figure 4 with an empty trolley passing through;

Figure 6 is an enlarged end elevation of the moving transfer work loop conveyor taken at the ready station along line 6—6 of Figure 20;

Figure 7 is a view similar to Figure 6 taken at the ready station of the waiting transfer work loop conveyor along line 7—7 of Figure 17;

Figure 8 is a side elevation taken along the line 8—8 of Figure 7;

Figure 9 is a side elevation of a section of free trolley conveyor track taken at an area of drive disengagement as indicated by arrow 9 in Figure 17;

Figure 10 is an end elevation of a free trolley at the transfer station in the waiting transfer work loop taken along the line 10—10 of Figure 2 showing mechanism for deflecting the free trolley load hanger to a by-passing position;

Figure 11 is a sectional view taken along the line 11—11 of Figure 2;

Figure 12 is a sectional view taken along the line 12—12 of Figure 17;

Figure 13 is a sectional view taken along the line 13—13 of Figure 3;

Figure 14 is a sectional view taken along the line 14—14 of Figure 30 showing a pivotal selective signaling arm;

Figure 15 is a partially sectioned view showing the double pivotal connection for the load hanger of a free trolley such as shown in Figure 6;

Figure 16 is a plan view of a pivoted drive dog for a free trolley taken along the line 16 of Figure 15;

Figure 17 is a fragmentary enlarged plan view of a section of the waiting transfer work loop illustrating mechanism for disengaging drive of the free trolleys;

Figure 18 is a fragmentary elevational view of a limit switch such as LS1 or LS3 in Figure 1 for receiving selective signals from the line conveyor trolleys;

Figure 19 is a sectional view taken along the line 19—19 of Figure 18;

Figure 20 is an enlarged plan view of the moving transfer work loop shown in Figure 1;

Figure 21 is an enlarged end elevation at the elevator station taken along the line 21—21 of Figure 20;

Figure 22 is a plan view of a hydraulic drive disengaging unit such as employed at the ready station of the waiting transfer work loop;

Figure 23 is a side elevation of the hydraulic unit shown in Figure 22;

Figure 24 is a sectional view taken along the line 24—24 of Figure 17;

Figure 25 is a plan view of the transfer station of the waiting transfer work loop similar to the view of Figure 20;

Figure 26 is a perspective view of the interlock signal linkage located at the ready station of the moving transfer work loop;

Figure 27 is a side elevation of the interlock mechanism shown in Figure 26 taken along line 27—27 of Figure 20;

Figure 28 is a plan view of the interlock mechanism shown in Figure 27;

Figure 29 is a further enlarged fragmentary partially sectioned end elevation of the interlock mechanism shown in Figures 6, 27 and 28;

Figure 30 is a side elevation of the interlock mechanism located at the main line conveyor approach to the moving transfer work loop taken along the line 30—30 of Figure 20 and in the direction of line 30 in Figure 31;

Figure 31 is an enlarged fragmentary plan view similar to that in Figure 20 of the interlock mechanism shown in Figure 30;

Figure 32 is an enlarged plan view of the trolley sensing unit shown in Figures 20 and 25;

Figure 33 is a sectional view taken along the line 33—33 of Figure 32;

Figure 34 is a sectional view taken along the line 34—34 of Figure 32;

Figure 35 is a further fragmentary enlarged view of selective signal setting mechanism shown in Figures 20 and 25;

Figure 36 is a side elevation taken along the line 36 of Figure 35.

Figure 37 is an end elevation of a free trolley and stabilizing latch arm at the elevator station taken along the line 37—37 of Figure 43;

Figure 38 is a schematic end elevation of the elevator station;

Figure 39 is a plan view taken along the line 39—39 of Figure 43;

Figure 40 is a schematic side elevation of the free trolley track at the elevator station illustrating limit switch operation;

Figure 41 is a side elevation of drive engagement control mechanism taken along the line 41—41 of Figure 49 omitting the stabilizing latch arm shown in Figure 43 for clarity;

Figure 42 is a fragmentary plan view taken along the line 42 of Figure 41;

Figure 43 is a side elevation of the stabilizing latch arm taken along the line 43 of Figures 37 and 49 omitting the engagement control mechanism shown in Figure 41 for clarity;

Figure 44 is a fragmentary view of the cam plate only shown in Figure 46 and taken along the line 44—44 of Figure 43;

Figure 45 is the latch plate shown in Figure 46 and taken along the line 45—45 of Figure 43;

Figure 46 is a composite sectional view of cam and latch plates taken along the line 46—46 of Figure 43;

Figure 47 is an end elevation of the drive control mechanism shown in Figure 41 taken along the line 47 of Figure 41;

Figure 48 is a sectional view taken along the line 48—48 of Figure 41;

Figure 49 is an enlarged plan view of the moving transfer work loop shown in Figure 1 illustrating mechanism for disengaging the drive of successive free trolleys;

Figure 50 is a sectional view of the elevator mechanism taken along the line 50—50 of Figure 21, with the transfer arm in the upper position shown in phantom;

Figure 51 is a fragmentary side elevation taken along the line 51—51 of Figure 49;

Figure 52 is a fragmentary end elevation taken along the line 52—52 of Figure 3;

Figure 53 is a fragmentary end elevation taken along the line 53—53 of Figure 3; and Figure 54 is a schematic electrical control diagram.

The detailed description is divided under the following headings:

(1) General description of overall system.
(2) Main line conveyor.
(3) Branch line work loop conveyor.
(4) Transfer through change in track level.
(5) Waiting transfer system.
(6) Moving transfer system.
(7) Elevator transfer system.
(8) Free trolley drive control.
   (a) Cylinder actuated drive control.
   (b) Mechanical interlock drive control.
   (c) Drive control at elevator station.
   (d) Drive control of successive free trolleys.
(9) Selective signaling system.
(10) Control circuit.
(11) Operation summary.

(1) GENERAL DESCRIPTION OF OVERALL SYSTEM

The schematic plan view of Figure 1 is limited to one of each of the waiting and moving transfer systems which are typical of the multiple work loops of one or the other or both types which may be employed in an actual industrial installation. Components referred to which are not illustrated in Figure 1 are illustrated in other figures and described in detail under subsequent headings. The main line conveyor runs continuously and through mechanical power take-offs 25a and 25b drive work loop pusher chains. With reference to the waiting transfer work loop, when a loaded free trolley at the ready station holds LS2 actuated and an empty line conveyor load bar approaching the work loop closes limit switch LS1, solenoid A is energized and the ready station cylinder 74 retracts a cam permitting a pusher bar on the drive chain to engage the free trolley and move it toward the transfer station. Limit switch LS2 is released and solenoid A is de-energized re-setting the ready station cylinder and cam. A load transfer from loop-to-line is effected and the empty free trolley disengages from its pusher bar and stops at the transfer station. A loaded line conveyor load bar designated for transfer to this particular work loop closes limit switch LS3 energizing solenoid B and the transfer station cylinder 74 retracts a cam permitting a pusher bar on the chain to move the free trolley out of the transfer station. Load transfer from line-to-loop is effected and the loaded free trolley continues around the work loop.

With reference to the moving transfer work loop, mechanical interlocks 157, 148 operated by an approaching line conveyor load bar when transfer is indicated release a free trolley from the work loop ready station. After transfer of the load from line-to-loop or loop-to-line is effected, depending on whether the free trolley is empty or loaded, the free trolley continues around the loop without stopping at the transfer station. Drive is disengaged and a latch stops the free trolley at the elevator station. Limit switch LS12 is closed by the free trolley to start the elevator which removes the load hook from the free trolley. Limit switch LS13 is actuated to stop the elevator in the down position and start a timer which delays return of the elevator for removal and replacement of the load. When the timer times out the elevator starts up and the latch holding the free trolley in the elevator station is actuated by the elevator after the new load is deposited thereon releasing the free trolley for movement to the ready station. The latch release is reset when the trolley leaves the elevator station to complete the cycle.

(2) MAIN LINE CONVEYOR

With reference to Figures 2, 3, 4 and 5, the main line conveyor comprises an endless I-beam track 20 generally of uniform level and having a transfer section, as at the transfer station of work loop 21 shown in Figures 1 and 2, including a rise in elevation 81 for effecting work loop to line transfers, a raised level section 82 corresponding to the disengaged waiting position of a free trolley after transfer of load to a line conveyor trolley, and a declining portion 83 at which transfer from the main line to a work loop free trolley takes place. As illustrated in Figure 3, a similar transfer section in the line conveyor track 20 is provided at the transfer station for work loop 22 including an upwardly inclined section 194 at which transfer from work loop to main line takes place, a raised level section 195 and a declining section 196 at which line conveyor to work loop transfer takes place. Line conveyor trolleys 36 are continuously propelled by conventional power chain drive 37 in turn driven by motor 15, Figure 1, and the lower ends of the trolleys 36 are adapted with a load bar 38 having one or more trailing arm signal flags 39 pivotally connected thereto and a forward facing load hook member 38a adapted to engage one side of a load hook 91 for conveyance thereof.

(3) BRANCH LINE WORK LOOP CONVEYOR

With reference to Figures 1, 6, 7, 8, 10 and 15, the conveyor for branch line waiting and moving transfer work loops 21 and 22 comprise two vertically aligned endless I-beam tracks including, in the case of work loop 21 (Figures 7, 8, 10 and 15), an upper track 23 on which trolleys 24 are continuously propelled by chain 25 driven by a power take-off 25a (Figure 1) from the main line conveyor. As best shown in Figure 8, the trolleys 24 carry a notched pusher 26 adapted to drive dog 27 mounted on free trolley 28 which run on a lower I-beam track 29. The pivot 30 permits the counter-weighted dog 27 to normally hold the transverse drive bar 62 (best shown in Figure 16) in the drive engagement position shown in Figure 8 with the pusher 26, such transverse bar 62 being adapted for deflection downwardly by cam members in the path of travel to a disengaging position. Each free trolley 28 carries a load hanger 31 which is mounted for pivotal movement in two directions, as best shown in Figure 15, a longitudinally extending pivot 58 permitting lateral swing of the hanger 31, as shown in Figure 10, limited in one direction by engagement of stop 61 with the driving arm 57 of the trolley assembly and a lateral pivot 58a permitting longitudinally swinging movement of the hanger 31 under the control of the cam follower element 59 rigidly secured to the hanger. At the lower end of the hanger 31 a hook element 87 is provided for engagement with a load hook 91 as best shown in Figure 6 (see also Figure 3 for side elevation of load hook 91).

As shown in Figure 6, the I-beam tracks 158 and 159 for the upper pusher trolleys 24 and lower free trolleys 28 of work loop 22 are similar to those for work loop 21 and in each case extend in endless, parallel, vertically aligned loops extending directly over the main line conveyor track at each of the transfer stations.

(4) TRANSFER THROUGH CHANGE IN TRACK LEVEL

With the above description of main line and branch work loop conveyor elements in mind, the basic transfer from loop-to-line conveyor and line-to-loop conveyor may be understood by referring to Figures 2 and 3. Considering first a transfer from loop-to-line conveyor, a loaded free trolley propelled by pusher chain toward the transfer section in synchronized relation with an empty line conveyor load trolley 36 will initially bring the load hook 91 into longitudinal and vertical alignment with the hook element 38a of the load bar 38 carried by the line conveyor trolley but at a level above the engagement level of hook element 38a with the rear portion 92 of the load hook 91. As the trolleys progress, the upward slope of track section 81, Figure 2, 194, Figure 3, will raise the level of hook elements 38a into engagement with the hook surface 92 lifting the load hook 91 off of the free trolley load hanger hook element 87.

In making a line conveyor-to-work loop transfer a reverse action takes place whereby as the trolley 36 descends the downward slope section 83, Figure 2, 196, Figure 3, in the line conveyor track, the load hook 91 suspended from the load bar 38 is lowered until hook surface 93 engages the free trolley hanger hook element 87 which is deflected backwardly into transfer position by the engagement of cam follower 59 with stationary cam 99 adjustably mounted on the track 29 as shown in Figure 2, in the case of work loop 21, or by the engagement of cam follower 59 with the lower surface 209 of cam 207 mounted on bar 202 as shown in Figure 3, in the case of work loop 22.

When the trolleys reach their respective former level, the load hook 91 suspended from the free trolley will be above the level of hook element 38a permitting free lateral displacement as the free trolley on the loop track departs from the path of the line conveyor.

While the same basic transfer principle is employed in the case of both the waiting transfer system of work loop 21 and the moving transfer system of the work loop 22, there are differences in the mechanism employed to control the free trolley load hanger 31 necessitated by the fact that in the case of work loop 21, the free trolley after delivering a load to the line conveyor is disengaged from its drive and waits at the intermediate section 82, Figure 2, until a designated load arrives to be transferred to the work loop, while in the case of work loop 22, the free trolley continues its travel after transfer of a load to the line conveyor. These differences in construction and operation are described below under separate headings.

(5) WAITING TRANSFER SYSTEM

The waiting transfer system, as mentioned above with reference to Figure 1, work loop 21, comprehends that all free trolleys are loaded trolleys; that a loaded free trolley is held at the ready station until an empty trolley on the line conveyor approaches the transfer section; that a transfer is thereupon made from loop-to-line conveyor at the upwardly inclined section 81 of the line conveyor track 20, Figure 2; that drive of the free trolley is disengaged at the intermediate area 82, the free trolley then waiting at the transfer station until a load designated for work loop 21 approaches whereupon drive of the free trolley is re-engaged; and the transfer from line-to-loop is effected on the downward slope 83 completing the transfer cycle whereupon a further free trolley at the ready station can be released for transfer to an empty line conveyor. Two requirements individual to the waiting transfer include automatic disengagement of the free trolley at the intermediate section 82, later described in detail; and the lateral deflection of the load hanger 31 to a by-passing position where it will not interfere with the progress of the line trolley load bar to which a transfer has just been made or subsequent line conveyor trolleys which may be required to pass prior to the approach of a loaded line conveyor trolley designated for that particular work loop. Such lateral deflection of the load hanger 31, pivoting about the longitudinal pivot 58, Figure 15, without longitudinal swinging about the transversed pivot 58a, Figure 15, is accomplished by simultaneous engagement of forward and aft cam followers 59 and 102 with the inclined cam track 84, Figure 2. After a clearance position is reached, the drive is disengaged with the forward cam follower 59 on the upper level portion 85 of the cam track and the aft cam follower on the corresponding level portion of adjacent cam track extension 101. Thereafter when drive is re-engaged for effecting a line-to-loop conveyor transfer, the hanger 31 is returned to normal vertical position by the downwardly sloping portion 86 engaged by cam follower 59 and corresponding portion of extension 101 engaged by follower 102 whereupon the forward cam follower 59 engages cam bar 99 to effect a rearward swinging of the hanger 31 as shown in phantom in Figure 2. It will be noted that such rearward swinging about the transverse pivot 58a can be effected by the forward cam follower 59 alone engaging cam bar 99 since lateral deflection is prevented by engagement of stop surface 61 with the trolley arm 57, Figure 15. The plate 96 on which cam bar 99 is mounted, is pivoted at 97 to a fixed frame member and held resiliently in its normal position as shown by a compression spring 100 which permits the cam bar 99 to yield when the load is transferred to the hanger 31 as clearly shown in Figures 2 and 11. After full engagement and transfer of the load hook 91 to the hanger 31 has taken place cam follower 59 leaves the cam bar 99 permitting the loaded hanger to swing forward to its normal position and continue its travel around the work loop track.

(6) MOVING TRANSFER SYSTEM

As previously mentioned with reference to Figure 1, a moving transfer system illustrated in connection with work loop 22 comprehends the circulation on the work loop of both loaded and unloaded free trolleys which may be in any irregular order, an empty or loaded free trolley being held at the ready station until a proper designated load or empty line conveyor trolley approaches the transfer section whereupon drive engagement of the free trolley at the ready station takes place to initiate the transfer. Considering first the case of a line-to-loop conveyor transfer where a designated loaded line trolley approaches the transfer station as an empty free trolley leaves the ready station, the first action which takes place is the engagement of the cam follower 59 with the cam bar 206, Figure 3, which is attached to the longitudinally extending bar 202 connected by parallelogram links 200 and 201 to a stationary member 199, the lower bar 202 being held in raised leftward position as shown by spring 203 to a limit established by engagement of plunger 210 with pad 211 under the predominant force of compression spring 203 reacting against fixed plunger housing 212. In the absence of a load on the free trolley hanger 31, the cam follower 59 merely rides up the cam bar 206 deflecting the load hanger 31 without overcoming the tension of spring 203 and the unloaded free trolley and loaded line trolley proceed past track section 195 until cam follower 59 engages the lower surface 209 of cam bar 207 attached to the lower bar 202 causing rearward pivotal movement of the hanger 31 as shown in phantom positioning the hanger load hook 87 below hook surface 93 of the load hook 91. As the trolley 36 proceeds down the decline 196 and transfers the load to hanger 31, the resilient spring 203 yields to permit forward swinging of hanger 31 to its normal position and the loaded free trolley proceeds around the loop track.

In the case of a loop-to-line conveyor transfer, the weight of the load on the free trolley is sufficient to resist deflection of the hanger 31 when the cam follower 59 engages cam bar 206 and the tension in spring 203 is overcome causing the lower bar 202 to swing down and forward whereupon a pivoted pawl 215, normally held against stop 217 by spring 216, is moved forward by the right end of cam bar 207 until the upper surface of such cam bar passes under the lower end of the pawl and further downward sufficiently for spring 216 to return pawl 215 to the normal position shown thereby forming a stop against the full return of bar 202 after the cam follower 59 passes off the surface of cam bar 207. Accordingly, the load is transferred to the line conveyor trolley on the upwardly inclined section 194 and when the empty free trolley cam follower 59 approaches cam bar 207, the failure of such cam bar to return fully from its lowermost position 207a causes the cam follower 59 to engage the upper surface 208 of such cam bar which will deflect the hanger 31 laterally out of transfer position during the interval that the trolley 36 is moving down the declining track section 196 thereby effectively preventing retransfer. When the cam follower 59 approaches the end of the cam bar 207, it engages the pawl 215 to release the stop action of such pawl permitting the bar 202 to be returned to normal position by spring 203, whereupon the empty free trolley proceeds around the work loop and the loaded line trolley proceeds to a further designated work loop.

(7) ELEVATOR TRANSFER SYSTEM

As previously mentioned, the elevator transfer system comprehends drive disengagement of a loaded free trolley at an elevator station, removal of the load from the free trolley and transfer by elevator mechanism to a work level where the load is removed by manual or automatic means, not shown, and a new load placed on the elevator mechanism for transfer back to the waiting empty free trolley. The elevator mechanism employed in effecting this operation is illustrated in Figure 21 wherein it is seen that a horizontal elevator load arm 227 having a load hook 228 is suspended from a guide arm 229 having upper and lower rollers 230 riding in a vertical guide track 231 and a cross arm 234 supporting parallel links 235 pivotally connected to the load arm 227. A drive sprocket 221, idler sprocket 222 and two fixed pinion sprockets 223, 224 establish the path for a drive chain 226 which is pivotally connected at 225 (see Figure 50) to the right end of load bar 227. As the drive sprocket 221 turns in a clockwise direction, the load bar is moved upwardly initially and then downwardly in an ever horizontal condition while the lateral position of the load hook 228 is established by the path of chain 226. Thus the engagement point of the hook 228 will follow a path, as shown by the broken line 228a, from an initial position, as shown in full line with the drive chain connection at position a, to a position for engaging the load hook 91 when the chain connection reaches the level of the axis of sprocket 221 and thereafter to an uppermost position when the chain connection reaches the position b, and a clearance position when it reaches the position c. Thereafter the downward travel follows a straight line to a load depositing position on a receiving hook 237 and to a retraction position, shown at 227-1, whereupon a limit switch LS13 is actuated to stop the elevator drive. After a time delay the drive is reenergized in a reverse direction causing the hook 228 to pick up a new load from the hook 237 and transfer it onto the waiting empty load hook 87 whereafter the load hook 228 moves to the original retraction position, shown in full line, and control rod 238 forming an extension of link 235 engages limit switch LS14 stopping the elevator. Additional functions and controls relating to free trolley drive engagement and disengagement will be described in a later section.

(8) FREE TROLLEY DRIVE CONTROL

From the description thus far it will be understood that control of the disengagement and re-engagement of the free trolley drive forms the main element in the control of the entire conveyor system. Thus in the waiting transfer system disengagement of drive at the ready station prevents movement of a loaded free trolley into the transfer station until an empty conveyor line trolley is ready to accept transfer and re-engagement of drive initiates the transfer while disengagement of the free trolley drive at the transfer station after transfer to line conveyor prevents re-transfer and effects a by-passing of empty and non-designated loaded line conveyor trolleys and re-engagement of drive at the proper time initiates the automatic transfer of a designated load from line-to-loop conveyor.

In the moving transfer system disengagement of loaded or unloaded free trolley drive at the ready station prevents movement of a loaded free trolley to the transfer station until an empty line conveyor trolley is ready to receive it or, in the case of an empty free trolley, until a designated load approaches the transfer station whereupon re-engagement of the drive at the proper time effects an automatic transfer. Likewise, in the elevator transfer system, disengagement of the free trolley drive at the elevator station forms the key to elevator transfer.

In addition, in order for any of these transfer systems to function with a plurality of free trolleys normally circulating on the loop conveyor, drive disengagement of successive trolleys approaching a waiting trolley at a ready or elevator station is an essential feature.

By employing free trolley drive disengagement and re-engagement as the basic control element, incorporation of selective dispatching from any work loop to any other work loop is reduced to the single function of controlling the drive disengaging means at the respective ready and waiting stations.

(a) Cylinder actuated drive control

With reference to Figures 17, 22 and 23, the cylinder actuated free trolley drive control, employed for purposes of illustration but not necessarily only in the waiting transfer station, includes similar installations at the ready station 45 and transfer station 46. A cam plate 71 having a transverse pivot 70 is actuated by piston 69 extending from cylinder 74 to a drive disengaging position in which the transverse bar 62 of a trolley drive dog 27 will be diverted laterally during its forward motion and to a disengaged position. A bumper element 75 forms a positive stop for the drive dog in order to assure accurate waiting position. When the piston rod is retracted and cam plate 71 raised, the counter-weighted dog is free to resume its normal drive position for engagement by the next pusher trolley to arrive. The plate 71 in raised non-disengaging position can be seen in Figure 8 and the controls for actuating the cylinders 74 are described in a later section.

(b) Mechanical interlock drive control

With reference to Figures 1 and 20, the control of the ready station 51 free trolley drive through mechanical interlock mechanism is accomplished through two input control movements from the main line approach 131 to the transfer station and one input movement from the free trolley at the ready station. Control rod 148 is actuated in response to a loaded condition of a line conveyor trolley regardless of the destination of the load while control rod 157 is actuated by either of two conditions of the selective signal means on such line trolley, later described in detail, indicating either (a) an empty condition of the line conveyor trolley or (b) a loaded trolley designated for this particular work loop. With reference to Figure 26, control rod 157 is pulled to the right whenever a loaded line conveyor trolley is designated for transfer or whenever an empty line conveyor trolley approaches the transfer station, while control rod 148 is pulled to the right whenever a loaded line conveyor trolley regardless of destination approaches the transfer station. The input control movement from a free trolley is made through a gauge rod 163 and bell crank lever 179 pivoted on rod 178 from stationary hangers 176 mounted on plate 177, spring 191 serving to support a portion of the overhanging weight of bell crank 179 to facilitate its actuation.

Bell crank 183 pivoted at 184 to fixed bracket 185 will raise the right end of a differential bar 182 whenever control rod 148 is pulled to the right by an approaching loaded main line trolley, while the left end of differential bar 182 will be raised by bell crank lever 179 whenever a loaded free trolley is at the ready station. Thus control rod 187, pivotally connected to the center of the differential bar 182, will have a lowermost position when neither free trolley at the ready station nor line trolley approaching the transfer station is in a loaded condition, will be raised one increment by a loaded condition of either one of such trolleys and will be raised two increments by a loaded condition of both of such trolleys.

A cam plate 161, mounted on bracket 171 attached to sleeve 162 pivoted at 168, is located in the path of the pusher dog for the free trolley and as best shown in Figures 6 and 27 is adapted to disengage drive by depressing lateral bar 62 to the position shown at 62a out of engagement with pusher 26 when in the position shown or to permit drive re-engagement when rotated about pivot 168 to a by-pass position. The specific mechanism for actuating the cam plate 161 to a drive disengaging and non-disengaging position may be more clearly understood by reference to detailed views shown in Figures 6, 27, 28, 29, 30 and 31. In Figure 6, loaded free trolley 28 is being driven by pusher trolley 24 toward the drive disengaging cam 161 shown in disengaging position and movable to non-disengaging position 161a. Continued progress of the free trolley will cause load hook 91 to actuate gauge rod 163 rotating bell crank lever 179 about pivot 178 thereby raising control rod 187. As shown in Figures 6, 27, 28, and in the enlarged view of Figure 29, control rod 187 is connected to the upturned end 180 of lever 172 pivotally connected at 174 to a member 173 which is freely rotatable on a bearing seat formed on the sleeve 162 which is in turn rotatable on pivot 168. Upward and downward movement of the control rod 187 from the mid-position shown causes a lug 170 attached to the member 180 to move from a position of engagement with a slot in member 169 (also shown in Figure 28) attached to lever arm 171 extending from sleeve 162 to a non-engaging position above the member 169 as shown at 170a or a non-engaging position below the member 169 as shown at 170b. If the lug 170 is in the slot engaging position as shown, a pull movement of control rod 157 rotating lever 172 and member 173 about the axis of pivot 168 will also rotate the lever 171 and sleeve 162 causing a displacement of disengagement cam 161 to the non-disengaging position shown at 161a. However, if the lug 170 is either above or below the engagement position with the slot in member 169, a pull movement of control rod 157 will merely cause a rotation of lever 172 and member 173 about the axis of pivot 168 without rotating sleeve 162 and without moving cam plate 161 from its drive disengagement position as shown where the lateral bar 62 of the drive dog 27 will be moved to a position 62a disengaging from pusher 26.

Thus, if a loaded free trolley enters the ready station actuating control rod 187 upwardly one increment to the position shown in Figure 29 and an empty line trolley approaches the transfer station, which will not move the control rod upwardly a second increment but will produce a pull movement on control rod 157, the sleeve 162 will be rotated moving cam 161 to its non-disengaging position 161a permitting the loaded free trolley to be driven to the transfer station for transfer to the empty line conveyor trolley. On the other hand, if while the loaded free trolley is at the ready station causing control rod 187 to assume the position shown and a loaded line conveyor trolley approaches the transfer station, the control rod 187 will be moved upwardly a second increment so that lug 170 will move to slot disengaging position 170a so that, even if the load is designated for transfer to this loop and a pull movement of control rod 157 accordingly occurs, the lever 172 and lever 173 will rotate about pivot 168 without moving sleeve 162 or cam 161 from the drive disengagement position shown.

If an empty free trolley enters the ready station having its drive disengaged by cam 161, control rod 187 will remain in its lowermost position with lug 170 at position 170b whereupon any empty line conveyor trolley, while actuating control rod 157, will not actuate sleeve 162. A loaded line conveyor trolley will move rod 187 and lug 170 to the slot engaging position shown but only if the load is designated for this work loop will control rod 157 be actuated to release the empty free trolley for transfer.

It remains to explain the mechanism by which control rods 157 and 187 are actuated by the condition of approaching line conveyor trolleys which may best be understood with reference to Figures 30 and 31. (In this connection it should be noted that while Figure 31 represents an enlarged plan view of a portion of the mechanism shown in Figure 20 with line conveyor travel from right to left, the side elevational view of Figure 30 is taken along the line 30—30 of Figure 20 and thus shows conveyor travel from left to right.) It will be seen that a loaded line conveyor trolley entering between flared ends 164, 165 of gauge rods 146, 151 will cause a lateral displacement of rod 146 as well as supporting arms 144 and 145 pinned at 138 and 139 to rod 134 pivotally supported in fixed hanger member 135. The resulting rotation of rod 134 actuates lever 141 connected thereto at 140 producing a pull movement of rod 148.

As previously mentioned, a signal arm 39 pivotally connected at 35 to the load bar 38 of line conveyor trolley 36 will, either in the positive signal position shown in full line or alternate empty position 40 shown in broken line, actuate one of the signal levers 42 or 43 connected to vertical rod 152 in turn connected at 155 to lever arm 156 and control rod 157 thereby producing a pull control movement on such rod when the line conveyor trolley is either in an unloaded condition or carrying a load designated for the particular work loop for which signal lever 42 is set.

(c) *Drive control at elevator station*

With reference to Figure 49 which includes an enlarged schematic plan view of the elevator station 54, shown in Figure 1, it will be seen that the transverse bar 62 of a free trolley drive dog is disengaged by cam 119 at the end of a horizontal bar 110 pivoted at 112 on a vertical axis and urged by spring 114 to a release position. With reference to Figures 41 and 42, pivotal release movement of the bar 110 is normally prevented by stop 240 at the end of rod 241 connected to a pivotally mounted cross shaft 242 in turn connected to an actuating bar 243, as best shown in Figure 47. At the lower end of the actuating rod 243, a bracket 244 is adapted to carry a cam pawl 239 pivoted at 236 and normally engaging a stop pin 245. When the control arm 238 associated with the elevator mechanism completes its return travel to the position shown in full line in Figure 21, it engages the cam surface of pawl 239 rocking arms 243 and 241 to the position shown in phantom in Figure 41 thereby releasing bar 110 for movement of cam 119 to a non-disengaging position and permitting the free trolley to leave the elevator station. In Figure 42, the release position of the stop 240 and bar 110 is indicated by phantom position 240a and 110a respectively.

As shown in Figures 47 and 48, when the free trolley enters the elevator station, rollers 250 engage stabilizing track 249 suspended from support 247 and transverse frame member 248. The trolley hanger is also stabilized by engagement with latch 256 (see Figures 43-46) mounted at the lower ends of arms 252 of a stabilizing assembly 251 which arms are pivoted at 253 to brackets 254 mounted on stationary plate 261. The position of hanger 31 at the elevator station is further controlled by stationary arm 258 best shown in Figures 37 and 43 as well as by the engagement of the leading cam follower 59 with a cam 259 pivoted at 259a to a stationary hanger 260 which cam is resiliently positioned by spring 262. In leaving the elevator station upon drive reengagement, the resistance of spring 262 is overcome and the upper end of hanger 31 is moved into engagement with cam surface 257, Figure 44, which forces the lower end of the hanger 31 out of engagement with the notch in latch plate 256, Figure 45, thus freeing the hanger 31 for movement out of the elevator station. Referring again to Figures 15 and 49, the free trolley arm 57 for mounting the drive dog 27 thereupon engages cam plate 116 attached to the end of bar 110 returning such bar to its normal drive disengaging position where it is held by the return of stop 240 (Figures 41 and 42).

*(d) Drive control of successive free trolleys*

The drive disengagement of successive free trolleys in sections at the approach to elevator or ready stations, such as shown in Figure 1 at 47 for loop 21 and at 53 for loop 22, when a leading free trolley is held at an elevator station or a ready station may be understood with reference to Figures 17, 49 and 51. A series of horizontal bars 110 similar to that described for the elevator station, each provided with a disengagement cam 119 and a positioning cam 116, are located behind each stopping station in a manner whereby a stationary trolley will actuate the bar 110 to a drive disengaging position for the next following trolley. The length of the bars 110 are somewhat shorter than the pitch length between successive trolleys so that each bar 110 will have an opportunity to return to normal non-blocking position without interrupting the drive of successive trolleys until a leading trolley is stopped. When drive for the leading trolley is re-engaged, the horizontal bars 110 extending backwardly therefrom are successively released to non-blocking position as the drive of succeeding trolleys release the positioning came 116.

(9) SELECTIVE SIGNALING SYSTEM

With further reference to Figures 14, 30 and 31, it will be understood that a signal arm 39 carried by the line conveyor load bar 38 may be positioned at any of a number of distinguishable levels betweeen that of lever 42 and lever 43 and that the lever 42 at successive work loops may be adjusted to correspond to different adjustment levels of the signal arm 39 thereby responding to a selective load designation signal only when the signal arm 39 is pre-positioned to a corresponding level. A re-setting cam track 143 is operative to re-set the signal arm of any empty trolley, which has delivered a load to the preceding work loop, to the level of lever 43 which is the same for all work loops. However, as shown in Figure 4 and 30, such re-setting cam track 143, being attached by arms 142 pinned at 137 to shaft 134, will be moved to an inoperative position whenever a loaded trolley is passing through. Accordingly, any signal arm 39 will retain its pre-set load designation position until after it has delivered a selective signal to a selective signal lever 42 which results in a load transfer from line-to-loop conveyor.

The remaining mechanism for the selective signaling system is that for automatically positioning a signal arm 39 at the time the associated line conveyor trolley receives a load from a given work loop having a particular destination at another work loop. Such mechanism is illustrated in Figures 20, 25, 32, 35 and 36. The selective setting mechanism generally designated at 280 is required to operate only when a transfer from loop-to-line conveyor takes place and must by-pass all loaded line conveyor trolleys having signal arms already set for a given further destination. As shown in Figures 35 and 36, the signal arm positioning mechanism comprises an adjustable cam bar 310 adapted when in its operative position to intercept the end of a signal arm 39 and raise it to a predetermined level established by the upper end of the cam bar. Such cam bar is mounted at one end on a bracket 307 depending from a support arm 305 pivotally mounted on a shaft 303 passing through a bearing 302 mounted on a stationary plate 301 from conveyor track 20. An arm 304 also, connected to shaft 303, is adapted to actuate the support arm 305 and cam bar 310 to a normally inoperative position as shown in phantom at 310a Figure 35 whenever rod 283 moves arm 304 to the phantom position shown at 304a. As best shown in Figure 32, the rod 283 is actuated by a lever arm 282 forming an extension of link 289 pivoted at 293 to a fixed support plate 294. The link 289 together with link 288 pivoted at 292 to support plate 294 are actuated by a free trolley sensing bar 287 engaged and laterally displaced by rollers 250 associated with free trolley 57. Thus the entrance of a free trolley between fixed guides 285 and 286 will move the sensing bar 287 from its normal position indicated in phantom at 287a against the tensioning of spring 297 to the full line position thereby moving arms 288 and 289 as well as the extension 282 from their normal positions 288a, 289a and 282a to the full line positions shown pushing rods 283 and lever arm 304 to the full line position shown in Figure 35 where the cam bar 310 will be operative to position the signal arm.

Referring again to Figure 36, the cam bar 310 is loosely connected at its lower end by pin 308 engaging an elongated slot 309 and its upper end is connected to adjustable positioning mechanism formed by pivotally connected links 315, 318 and actuating arm 312. The upper link 318 is pivotally connected at 319 to the support arm 305 while the actuating arm 312 projects from an actuating mechanism 311 for remote control setting of the arm 312 and cam bar 310. Such remote control mechanism for positioning arm 312 is a standard commercial unit details of which do not form a part of this invention and further description of such unit is therefore omitted. It will be apparent from the above description that movement of the arm 312 from the intermediate position shown, providing a signal arm level at 316, in an upward or downward direction will provide adjustment of signal arm level to any of the positions between 316a and 316b.

Accordingly, whenever a loaded line conveyor designated for another work loop passes through a transfer station without free trolley movement out from the ready station, the normal inoperative position 310a of the cam bar 310 will permit passage without signal arm re-setting; while the transfer of a load from a free trolley to line conveyor will cause the cam bar to move to an operative position setting the signal flag for a destination corresponding to the upper level of the cam bar 310.

With reference to Figures 1, 18 and 19, the selective signaling actuation of a limit switch such as LS3 is effected by contact of the signal arm 39 with a lever 330 pivotally connected at 329 to a limit switch 328 mounted on the end 327 of a plate 325 adjustably connected by screws 326 to a bracket 324 in turn adjustably attached at 323 to a support arm 321 suspended from the track 20.

While only a single signal arm has been described, which is sufficient for selective identification of as many as ten separate work loops, it will be understood that a second signal arm could be employed where a larger number of work loops is involved whereby a combination of levels of the two signal arms could be employed to distinguish between as many as one hundred separate work loops. It is believed that the adaptation of such second signal arm to the present system will be obvious to anyone skilled in the art.

(10) CONTROL CIRCUIT

With reference to Figures 1, 38, 40 and 54, the electrical and hydraulic controls for the entire conveyor system may be understood. In Figure 54, M1, M2, M3 and M4 represent line contactors respectively for a motor for pump 66, a motor for line conveyor drive 15 and forward and reverse contactors for the elevator motor (232 Figure 21); G1, G2 and G3 are lights indicating power on, pump on and conveyor on; R1 and R2 are lights indicating overload failures of power take-off drives 25a and 25b; T is the energizing coil for the elevator timer; C is the closing coil for a spring return relay having contacts designated C; L1 and L2 are latching and unlatching coils for a latch type relay having contacts designated L1; L2 and UL2 are latching and unlatching coils for a latch type relay having contacts designated L2; and Sol. "A" and Sol. "B" are energizing coils for the respective solenoid valves 67 and 68 for transfer station and ready station cylinders 74b and 74. Manual push button controls include an off-on pump switch 272, emergency stop and re-set switches 270, 271, a conveyor stop switch 273, a conveyor start switch 274, an elevator switch S having automatic and manual positions, an elevator jogging up switch J1 and an elevator jogging down switch J2.

Limit switches include (Figure 1) LS1 closed momentarily by the signal of an empty line conveyor trolley load bar, LS2 actuated by a free trolley at the loop 21 ready station, LS3 closed momentarily by the signal arm on a load bar with load designated for transfer to work loop 21, LS4 closed momentarily by a free trolley leaving the transfer station, LS5 actuated when a shear pin fails on the loop 21 power take-off 25a, LS6 actuated when a shear pin fails on the loop 22 power take-off 25b, LS7 opened by a mechanism on the line conveyor drive when overloaded, LS11 (Figure 40) opened by free trolley release when the elevator completes its up cycle and re-set to closed position when the free trolley leaves the elevator station, LS12 closed by a free trolley in the elevator station, LS13 (Figure 38) closed when the elevator reaches its down position, LS14 closed when the elevator reaches its up position, and LS15 held closed while elevator is engaging the trolley latch release cam (239 Figure 41).

(11) OPERATION SUMMARY

With M1 and M2 energized, Figure 54, the line conveyor, Figure 1, runs continuously and through mechanical power take-off, 25a and 25b, drives the work loop 21 and 22 pusher chains.

With reference to the waiting transfer work loop 21, Figure 1, when a loaded free trolley at the ready station holds limit switch LS2 actuated and an empty line conveyor load bar approaching loop 21 closes limit switch LS1, control relay C, Figure 54, locks energizing solenoid A causing the ready station cylinder 74, Figures 1 and 23, to retract the cam plate 71 permitting re-engagement of the free trolley drive moving it toward the transfer station. Limit switch LS2 is released latching in relay L1. Relay C and solenoid A are de-energized re-setting the ready cylinder and cam. Load transfer from loop-to-line is effected and the empty free trolley disengages from its pusher bar and stops at the transfer station. A loaded line conveyor load bar designated for transfer to work loop 21 closes limit switch LS3, Figures 1 and 54, relay L2 latches in energizing solenoid B and the transfer station cylinder 74b retracts a cam permitting a pusher bar on the work loop 21 chain to move the free trolley out of the transfer station. Relay L1 is unlatched re-setting the circuit to relay C for letting the next trolley out of the ready station when an empty line trolley approaches. Limit switch LS4 is momentarily closed to unlatch relay L2 and re-set the transfer station cylinder and cam. Load transfer from line-to-loop is effected and the loaded free trolley continues around work loop 21.

With reference to work loop 22, Figure 1, mechanical interlocks actuating control rods 148 and/or 157 release a free trolley from the work loop ready station. After transfer of the load from line-to-loop or loop-to-line is effected the free trolley continues empty or loaded around the work loop without stopping at the transfer station. A drive release cam 119, Figure 49, and latch 256, Figure 37, stops the free trolley at the elevator station. Limit switch LS12 is closed by the free trolley. A circuit energizing contactor M4, Figure 54, through limit switches LS11, LS12, LS14 and LS13 starts the elevator down and limit switch LS13 is actuated opening the M4 circuit to stop the elevator in the down position. This also closes the circuit to the timer T opening contact T1 for a predetermined time delay after which line contactor M3 is energized through limit switches LS11, LS12 and LS14 to start the elevator up. The stop 240, Figure 41, holding the free trolley in the elevator station is actuated by the elevator releasing the free trolley and opening limit switch LS11. Limit switch LS15 by-passes limit switch LS11 to prevent the elevator from stopping on the latch release and delaying re-setting of the trolley latch. Limit switch LS14 is actuated by the elevator in up position opening the circuit to contactor M3 to stop the elevator. Limit switch LS11 and the latch release are re-set when the trolley is moved out of the elevator station to continue to the ready station and thus complete the cycle.

While a preferred embodiment has been disclosed and described in detail, it will be understood that numerous modifications may be resorted to without departing from the scope of my invention as defined in the following claims.

I claim:

1. A conveyor transfer system comprising an endless main conveyor track, an endless branch conveyor track, continuously driven load trolleys on said main conveyor track, free load trolleys on said branch conveyor track, continuously running disengageable drive means along said branch conveyor track for propelling said free trolleys in synchronized relation to said continuously driven trolleys, a load hook, load hook engaging means on each of said trolleys, a transfer station at which said conveyor tracks extend adjacent each other, means including first and second relatively sloping sections in said conveyor tracks at said transfer station adapted to effect respectively a branch-to-main and a main-to-branch load hook transfer between trolleys while propelled in properly timed relation, means for disengaging a branch trolley from said free trolley drive means, and means responsive to relatively compatible transfer conditions of said branch trolley and an approaching main trolley for re-engaging the drive of said branch trolley to effect a load hook transfer between trolleys at said transfer station.

2. A conveyor transfer system as set forth in claim 1 including means operative after a branch-to-main transfer at said first sloping section for preventing re-transfer between the same trolleys from main-to-branch conveyor at said second sloping section.

3. A conveyor transfer system comprising an endless main conveyor track, a plurality of endless branch conveyor tracks, continuously driven load trolleys on said main conveyor track, free load trolleys on said branch conveyor track, continuously running disengageable drive means along said branch conveyor track for propelling said free trolleys in scychronized relation to said continuously driven trolleys, a load hook, load hook engaging means on each of said trolleys, a transfer station for each of said branch conveyor tracks at which said branch and main conveyor tracks extend adjacent each other, means including first and second relatively sloping sections in said conveyor tracks at each transfer station adapted to effect respectively a branch-to-main and a main-to-branch load hook transfer between trolleys while propelled in properly timed relation, means for disengaging a branch trolley from said free trolley drive means, means responsive to relatively compatible transfer conditions of said branch trolley and an approaching main trolley for re-engaging drive of said branch trolley to effect a load hook transfer between trolleys at each transfer station, selective means for identifying a loaded main conveyor trolley with certain of said branch conveyor tracks, said means for re-engaging drive including means selectively responsive to said identification whereby selective dispatching to different branch conveyor tracks may be effected.

4. A conveyor transfer system as set forth in claim 3 including automatic means operatively associated with a branch-to-main transfer operation for establishing said identification of branch destination for the transferred load hook.

5. A conveyor transfer system comprising an endless main conveyor track, an endless branch conveyor track, continuously driven load trolleys on said main conveyor track, free load trolleys on said branch conveyor track, continuously running disengageable drive means along said branch conveyor track for propelling said free trolleys in synchronized relation to said continuously driven trolleys, a load hook, load hook engaging means on each of said trolleys, a transfer station at which said conveyor tracks extend adjacent each other with said main conveyor track below said branch conveyor track, means including converging and diverging sections in said conveyor tracks at said transfer station adapted to effect respectively a branch-to-main and a main-to-branch load hook transfer between trolleys while propelled in properly timed relation, the load hook engaging means on said free trolleys extending downwardly to a suitable transfer level relative to said main conveyor trolley load hook engaging means, said load hook engaging means on said free trolley having a connection accommodating lateral deflection to a non-transferring, non-interfering position, means for disengaging a branch trolley from said free trolley drive means, means responsive to relatively compatible transfer conditions of said branch trolley and an approaching main trolley for re-engaging drive of said branch trolley to effect a load hook transfer between trolleys at said transfer station, and means for deflecting said load hook engaging means of a free trolley to said non-transferring, non-interfering position after effecting a branch-to-main line transfer at said converging section.

6. A conveyor system as set forth in claim 1 wherein said means for disengaging a trolley from said free trolley drive means is located at a ready station approach to said transfer station, said ready station having a positionable member movable to a position for disengaging the drive means for a free trolley approaching said transfer station and to a second re-engagement position.

7. A conveyor system as set forth in claim 1 including means for disengaging successive trolleys from said drive means as they approach a preceding disengaged free trolley.

8. A conveyor transfer system as set forth in claim 1 including means for successively alternating branch-to-main and main-to-branch load hook transfers made at such transfer station.

9. A conveyor transfer system as set forth in claim 1 wherein all free trolleys approaching said transfer station have load hooks engaged thereon.

10. A conveyor transfer system as set forth in claim 1 wherein all free trolleys approaching said transfer station have load hooks engaged thereon and wherein means are provided at said transfer station to disengage the drive for a free trolley at said transfer station after effecting a branch-to-main transfer to await a loaded trolley approaching said transfer station on said main conveyor requiring transfer to said branch conveyor.

11. A conveyor transfer system as set forth in claim 1 wherein free trolleys circulate on said branch track both with and without load hook thereon and including means for determining the order of load hook transfer from branch-to-main or from main-to-branch conveyor responsive to the loaded or unloaded condition of a free trolley approaching the transfer station.

12. A conveyor transfer system as set forth in claim 1 including means for transferring a load hook from a free trolley on said branch conveyor to a fixed load station.

13. A conveyor transfer system as set forth in claim 1 including means for transferring a load hook from a free trolley on said branch conveyor to a fixed load station, and including means for disengaging free trolley drive preparatory to said last transfer.

14. A conveyor transfer system as set forth in claim 1 including reciprocable means for transferring a load hook from a free trolley on said branch conveyor to a fixed load station and for returning a load hook from said station and time delay means controlling the return movement.

15. A conveyor transfer system as set forth in claim 1 including means for transferring a load hook from a free trolley on said branch conveyor to a fixed load station, said means including a chain driven transfer arm and sprocket means establishing the path of said chain.

16. A conveyor transfer system as set forth in claim 1 including an elevator station adjacent said branch track, means for disengaging a trolley from said free trolley drive means at said elevator station, means for transferring a load hook from said free trolley to a fixed load station, time delay means accommodating replacement of said load hook, said means for transferring being adapted to return said replacement load hook to said disengaged free trolley, and means for re-engaging said free trolley drive upon delivery of said replacement load hook.

17. A conveyor transfer system comprising a main conveyor track, a branch conveyor track, power driven load trolleys on said main conveyor track, free load trolleys on said branch conveyor track, continuously running disengageable drive means along said branch conveyor track for propelling said free trolleys in synchronized relation to said main conveyor trolleys, load hooks, load hook engaging means on each of said trolleys, a transfer station at which said conveyor tracks extend adjacent each other, means including relative change in level in said conveyor tracks for effecting a load transfer between trolleys on said tracks at said transfer station, means for disengaging a branch trolley from said free trolley drive means, and means responsive to relatively compatible transfer conditions of said branch trolley and an approaching main trolley for re-engaging drive of said branch trolley to effect a load hook transfer between trolleys at said transfer station.

18. A conveyor transfer system comprising a main conveyor track, a plurality of branch conveyor tracks, power driven load trolleys on said main conveyor track, free load trolleys on each of said branch conveyor tracks, continuously running disengageable drive means along each of said branch conveyor tracks for propelling said free trolleys in synchronized relation to said main conveyor trolleys, load hooks, load hook engaging means on each of said trolleys, a transfer station between each of said branch tracks and said main conveyor track at which each branch conveyor track extends adjacent said main conveyor track, means including relative change in level in said branch and main conveyor tracks for effecting a load hook transfer between trolleys on said tracks at said transfer station, means on each of said branch tracks for disengaging a branch trolley from said free trolley drive means, means responsive to relatively compatible transfer conditions of said branch trolley and an approaching main trolley for re-engaging drive of said branch trolley to effect a load hook transfer between trolleys at said transfer station, means for selectively identifying loaded main conveyor trolleys as to branch track destination, and said means for re-engaging including means selectively responsive to said identification means whereby selective dispatching and transferring to branch conveyors may be effected.

19. A conveyor transfer system comprising an endless main conveyor track, an endless branch conveyor track, power driven load trolleys on said main conveyor track, free load conveyor trolleys on said branch conveyor track, continuously running disengageable drive means along said branch conveyor track for propelling said free trolleys in synchronized relation to said continuously driven trolleys, load hooks, load hook engaging means on each of said trolleys, a transfer station at which said conveyor tracks extend adjacent each other, means including first and second relatively sloping track sections at said transfer station adapted to effect respectively a branch-to-main conveyor load hook transfer when a loaded free trolley and an unloaded main conveyor trolley are propelled together through said first sloping track section and a main-to-branch conveyor load hook transfer when an unloaded free trolley and a loaded main conveyor trolley are propelled together through said second sloping track section, and means for preventing re-transfer of said load hook between the same trolleys at said second sloping track section following an initial transfer at said first sloping track section.

20. A conveyor transfer system comprising an endless main conveyor track, an endless branch conveyor track, power driven load trolleys on said main conveyor track, free load conveyor trolleys on said branch conveyor track, continuously running disengageable drive means along said branch conveyor track for propelling said free trolleys in synchronized relation to said continuously driven trolleys, load hooks, load hook engaging means on each of said trolleys, a transfer station at which said conveyor tracks extend adjacent each other, means including first and second relatively sloping track sections at said transfer station adapted to effect respectively a branch-to-main conveyor load hook transfer when a loaded free trolley and an unloaded main conveyor trolley are propelled together through said first sloping track section and a main-to-branch conveyor load hook transfer when an unloaded free trolley and a loaded main conveyor trolley are propelled together through said second sloping track section, and means for preventing re-transfer of said load hook between the same trolleys at said second sloping track section following an initial transfer at said first sloping track section comprising means for deflecting the load hook engaging means of one of said trolleys out of transfer position while traversing said second sloping track section.

21. A conveyor transfer system comprising an endless main conveyor track, an endless branch conveyor track, power driven load trolleys on said main conveyor track, free load conveyor trolleys on said branch conveyor track, continuously running disengageable drive means along said branch conveyor track for propelling said free trolleys in synchronized relation to said continuously driven trolleys, load hooks, load hook engaging means on each of said trolleys, a transfer station at which said conveyor tracks extend adjacent each other, means including first and second relatively sloping track sections at said transfer station adapted to effect respectively a branch-to-main conveyor load hook transfer when a loaded free trolley and an unloaded main conveyor trolley are propelled together through said first sloping track section and a main-to-branch conveyor load hook transfer when an unloaded free trolley and a loaded main conveyor trolley are propelled together through said second sloping track section, and means for preventing re-transfer of said load hook between the same trolleys at said second sloping track section following an initial transfer at said first sloping track section comprising means for disengaging drive of a free trolley between said first and second sloping track sections.

22. A conveyor transfer system as set forth in claim 17 wherein said means for disengaging a trolley from said free trolley drive means includes means for sensing the loaded or unloaded condition of a main conveyor trolley approaching said transfer station.

23. A conveyor transfer system as set forth in claim 17, wherein said means for disengaging a trolley from said free trolley drive means includes means for sensing the loaded or unloaded condition of a main conveyor trolley approaching the transfer station, and said means for re-engaging drive is responsive only to a main conveyor trolley condition opposite to the condition of the disengaged trolley.

24. A conveyor transfer system as set forth in claim 17 including a plurality of branch conveyor tracks, selective means for identifying a loaded main conveyor trolley as to branch conveyor track destination, said means for re-engaging drive including means selectively responsive to said identification whereby selective dispatching to different branch conveyor tracks may be effected together with by-passing of any intervening branch conveyor tracks.

25. A conveyor transfer system as set forth in claim 17 including a plurality of branch conveyor tracks, selective means for identifying a loaded main conveyor trolley as to branch conveyor track destination, said means for re-engaging drive including means selectively responsive to said identification whereby selective dispatching to different branch conveyor tracks may be effected together with by-passing of any intervening branch conveyor tracks and non-selective means for identifying an empty main conveyor trolley.

26. A conveyor transfer system comprising a main conveyor track, a branch conveyor track, power driven load trolleys on said main conveyor track, free load trolleys on said branch conveyor track, a continuously running pusher chain disposed along said branch conveyor track, disengageable drive dog means on each of said free trolleys adapted to normally engage said pusher chain for movement in synchronized relation to said main conveyor trolleys, load hooks, load hook engaging means on each of said trolleys, a transfer station at which said conveyor tracks extend adjacent to each other, means including relative change in level in said conveyor tracks for effecting a load transfer between said trolleys on said tracks at said transfer station, retractable cam means located at the approach of said branch conveyor track to said transfer station for disengaging a trolley drive dog from said pusher chain, said retractable cam means having a position adapted to disengage drive of an approaching free trolley, and mechanism for moving said cam means to a retracted position permitting drive re-engagement.

27. A conveyor transfer system as set forth in claim 26 including mechanism responsive to relatively compatible transfer conditions of respective branch and main trolleys requiring either a branch-to-main or main-to-branch transfer for moving said cam means to said re-engagement position.

28. A conveyor transfer system as set forth in claim 26 including mechanism responsive to relatively compatible transfer conditions of respective branch and main trolleys requiring either a branch-to-main or main-to-branch transfer for moving said cam means to said re-engagement position, said mechanism including means responsive to an unloaded condition of a mian conveyor trolley approaching said transfer station.

29. A conveyor transfer system as set forth in claim 26 including mechanism responsive to relatively compatible transfer conditions of respective branch and main trolleys requiring either a branch-to-main or main-to-branch transfer for moving said cam means to said re-engagement position, said mechanism including means responsive to an unloaded condition of a main conveyor trolley approaching said transfer station and a loaded condition of said free trolley.

30. A conveyor transfer system as set forth in claim 26 including a plurality of branch conveyor tracks, selective means for identifying a loaded main conveyor trolley as to branch track destination, and means responsive to said identifying means for initiating a main-to-branch conveyor transfer.

References Cited in the file of this patent
UNITED STATES PATENTS

| | | |
|---|---|---|
| 1,875,966 | Webb et al. | Sept. 6, 1932 |
| 2,344,155 | McBride et al. | Mar. 14, 1944 |
| 2,527,244 | Culver | Oct. 24, 1950 |
| 2,580,758 | Gibson | Jan. 1, 1952 |
| 2,684,039 | King | July 20, 1954 |
| 2,688,931 | Spafford | Sept. 14, 1954 |
| 2,688,936 | Brooks | Sept. 14, 1954 |
| 2,816,643 | Klamp | Dec. 17, 1957 |
| 2,845,034 | Harrison | July 29, 1958 |

UNITED STATES PATENT OFFICE
CERTIFICATE OF CORRECTION

Patent No. 2,940,400                      June 14, 1960

Homer S. Harrison

It is hereby certified that error appears in the printed specification of the above numbered patent requiring correction and that the said Letters Patent should read as corrected below.

Column 3, lines 1 and 2, for "conditions relatively compatible transfer" read -- relatively compatible transfer conditions --; column 8, line 64, for "in" read -- is --; column 11, line 16, before "free" insert -- loaded --; column 13, line 61, for "came" read -- cams --; column 20, line 35, for "wih" read -- with --.

Signed and sealed this 20th day of December 1960.

(SEAL)
Attest:

KARL H. AXLINE
Attesting Officer

ROBERT C. WATSON
Commissioner of Patents